/

US006842562B2

(12) United States Patent
Kinoshita et al.

(10) Patent No.: US 6,842,562 B2
(45) Date of Patent: Jan. 11, 2005

(54) OPTICAL ADD/DROP NODE AND METHOD

(75) Inventors: Susumu Kinoshita, Plano, TX (US); Koji Takeguchi, Richardson, TX (US)

(73) Assignee: Fujitsu Network Communications, Inc., Richardson, TX (US)

( * ) Notice: Subject to any disclaimer, the term of this patent is extended or adjusted under 35 U.S.C. 154(b) by 81 days.

(21) Appl. No.: 10/159,307

(22) Filed: May 30, 2002

(65) Prior Publication Data
US 2003/0223682 A1 Dec. 4, 2003

(51) Int. Cl.[7] .................................................. G02B 6/28
(52) U.S. Cl. .............................. 385/24; 385/31; 398/68; 398/72
(58) Field of Search ....................... 385/24, 31; 398/43, 398/66, 68, 72

(56) References Cited

U.S. PATENT DOCUMENTS

| 5,323,258 | A | 6/1994 | Tsushima et al. | 359/190 |
|---|---|---|---|---|
| 5,510,920 | A | 4/1996 | Ota | 359/121 |
| 5,550,818 | A | 8/1996 | Brackett et al. | 370/60 |
| 5,576,875 | A | 11/1996 | Chawki et al. | 359/125 |
| 5,748,811 | A | 5/1998 | Amersfoort et al. | 385/15 |
| 5,771,112 | A | 6/1998 | Hamel et al. | 359/128 |
| 5,774,606 | A | 6/1998 | de Barros et al. | 385/24 |
| 5,778,118 | A | 7/1998 | Sridhar | 385/24 |
| 5,903,371 | A | 5/1999 | Arecco et al. | 359/119 |
| 5,905,838 | A | 5/1999 | Judy et al. | 385/123 |
| 5,959,749 | A | 9/1999 | Danagher et al. | 359/124 |
| 6,025,941 | A | 2/2000 | Srivastava et al. | 359/119 |
| 6,028,898 | A | 2/2000 | Sparks et al. | 375/317 |
| 6,038,357 | A | 3/2000 | Pan | 385/24 |
| 6,040,933 | A | 3/2000 | Khaleghi et al. | 359/124 |
| 6,101,012 | A | 8/2000 | Danagher et al. | 359/127 |
| 6,115,156 | A | 9/2000 | Otani et al. | 359/124 |
| 6,125,220 | A | 9/2000 | Copner et al. | 385/27 |

(List continued on next page.)

FOREIGN PATENT DOCUMENTS

| EP | 0 848 514 A2 | 6/1998 | ............ H04J/14/02 |
|---|---|---|---|
| EP | 0 855 814 A2 | 7/1998 | ............ H04J/14/00 |
| EP | 1 006 688 A2 | 6/2000 | ............ H04J/14/02 |
| WO | 99/65164 | 12/1999 | ......... H04B/10/213 |

OTHER PUBLICATIONS

Kinoshita et al., "Flexible Twin Open Ring Metro WDM Network," OECC, pp. 713–714, Oct. 2003.
Tian et al., "OUPSR Protected Flexible Metro WDM Network," ECOC, pp. 826–827, 2003.
Boskovic et al., "Broadcast and Select OADM Nodes Application and Performance Trade-offs," OFC, pp. 158–159, 2002.
Kinoshita et al. "Flexible Metro WDM Network with Photonic Domains", Fujitsu Laboratories of America, Inc. , 3 pages, Feb. 24–26, 2004.
Suzuki et al., "Prototype of 12.5GHz-Spaced Tapped-Type OADM for DWDM Metro Ring Networks," ECOC–IOOC Proceedings—vol. 4, pp. 902–903, Sep. 21–25, 2003.

(List continued on next page.)

Primary Examiner—Rodney Bovernick
Assistant Examiner—Sung Pak
(74) Attorney, Agent, or Firm—Baker Botts L.L.P.

(57) ABSTRACT

An add/drop node (OADN) comprises a network optical fiber carrying a signal on an optical network. A network drop splitter is coupled to the network optical fiber and to stages of drop splitters, the stages of drop splitters being operable to passively split an optical signal from the network drop splitter into multiple copies of the signal. The OADN further comprises at least one filter operable to receive at least a copy of the signal from at least one drop splitter to create a filtered copy, and further comprises at least one broadband receiver operable to receive the filtered copy from the filter.

25 Claims, 14 Drawing Sheets

U.S. PATENT DOCUMENTS

| | | | | |
|---|---|---|---|---|
| 6,151,356 | A | 11/2000 | Spagnoletti et al. | 375/226 |
| 6,160,648 | A | 12/2000 | Öberg et al. | 359/110 |
| 6,160,660 | A | 12/2000 | Aina et al. | 359/341 |
| 6,166,838 | A | 12/2000 | Liu et al. | 359/128 |
| 6,172,801 | B1 | 1/2001 | Takeda et al. | 359/337 |
| 6,181,849 | B1 | 1/2001 | Lin et al. | 385/24 |
| 6,188,816 | B1 | 2/2001 | Solheim | 385/24 |
| 6,192,172 | B1 | 2/2001 | Fatehi et al. | 385/17 |
| 6,192,173 | B1 | 2/2001 | Solheim et al. | 385/24 |
| 6,201,909 | B1 | 3/2001 | Kewitsch et al. | 385/37 |
| 6,205,158 | B1 | 3/2001 | Martin et al. | 370/541 |
| 6,208,440 | B1 | 3/2001 | Jang | 359/127 |
| 6,222,654 | B1 | 4/2001 | Frigo | 359/119 |
| 6,226,117 | B1 | 5/2001 | Hentschel | 359/337 |
| 6,236,499 | B1 | 5/2001 | Berg et al. | 359/341 |
| 6,243,517 | B1 | 6/2001 | Deacon | 385/50 |
| 6,268,951 | B1 | 7/2001 | Chen et al. | 359/279 |
| 6,275,331 | B1 | 8/2001 | Jones et al. | 359/341.44 |
| 6,288,834 | B1 | 9/2001 | Sugaya et al. | 359/341.1 |
| 6,298,038 | B1 | 10/2001 | Martin et al. | 370/216 |
| 6,331,906 | B1 | 12/2001 | Sharma et al. | 359/119 |
| 6,445,850 | B1 * | 9/2002 | Zhou et al. | 385/24 |
| 6,529,303 | B1 * | 3/2003 | Rowan et al. | 398/82 |
| 2002/0145779 | A1 | 10/2002 | Strasser et al. | 359/124 |

OTHER PUBLICATIONS

Wolde, J., et al., "Optical Ethernet Metro Access Network Protype: Implementation and Results," ECOC–IOOC 2003, 3 pages, Sep. 21–25, 2003.

Vasilyev et al., "80x10.7 Gb/s Ultra–Long–Haul (+4200 km) DWDM Network with Reconfigurable 'Broadcast & Select' OADMs," *OFC 2002 Postdeadline Papers, Corning Incorporated*, 2002, 3 pages.

Grenfeldt, "ERION–Ericsson optical networking using WDM technology," Ericsson Review No. 3, pp. 132–137, 1998.

Ashmead, "ROADMap for the Metro Market," Fiberoptic Product News, 3 pages (36, 38, and 40), Oct. 2001.

Batchellor, "Optical Networking the Ericsson Way," Ericsson Limited, Business Unit Transport and Cable Networks, pp. 1–4, Feb. 22, 2002.

Goldstein, E., "Optical Ring Networks with Distributed Amplification," IEEE Photonics Technology Letters, vol. 3, No. 4, Apr. 1991, 4 pages.

Gerstel, O. of Nortel Networks, "Optical Layer Survivability," Tutorial T4, slides of OMS DPRing: Flexing Bus and Pros/Con of Flexing Bus, OptiComm 2000, Conference on Optical Communications and Networking, Oct. 2000, 2 pages.

Chan, V. et al., "Optical Distribution Networks," OptiComm 2000: Optical Networking and Communications, Proceedings of SPIE, vol. 4233, Oct. 2000, 12 pages.

Chan, C., "Optical distribution networks," Optical Networks Magazine, Jan./Feb. 2002, 9 pages.

Martin, C., et al., "A Flexible Broadband Wavelength Multiplexer," Proceedings of SPIE, vol. 4532, 2001, 12 pages.

Mookherjea, S., "Remotely Pumped Optical Distribution Networks: A Distributed Amplifier Model," Journal of Lightwave Technology, vol. 19, No. 7, Jul. 2001, 7 pages.

Batchellor, R. "Optical Networking the Ericsson Way, " Ericsson Limited, Business Unit Transport and Cable Networks, Feb. 22, 2002, 4 pages.

U.S. Appl. No. 10/108,734, entitled "Method and System for Control Signaling in an Open Ring Optical Network," filed Mar. 27, 2002.

U.S. Appl. No. 10/108,741, entitled "Method and System for Testing During Operation of an Open Ring Optical Network," filed Mar. 27, 2002.

U.S. Appl. No. 10/112,022, entitled "Flexible Open Ring Optical Network and System and Method," filed Mar. 28, 2002.

U.S. Appl. No. 10/158,523, entitled "Optical Ring Network with Optical Subnets and Methods," filed May 29, 2002.

U.S. Appl. No. 10/158,348, entitled "Multiple Subnets in an Optical Ring Network and Method," filed May 29, 2002.

U.S. Appl. No. 10/159,499, entitled "Combining and Distributing Amplifiers for Optical Network and Method," filed May 30, 2002.

U.S. Appl. No. 10/159,464, entitled "Passive Add/Drop Amplifier for Optical Network and Method," filed May 30, 2002.

PCT, Notification of Transmittal of the International Search Report or the Declaration, International Application No. PCT/US03/15649, 7 pages, Feb. 3, 2004.

Bacque, B. et al., "R–OADM Architecture—Now you can Control the Light," Tropic Networks, pp. 1–11, 2003.

* cited by examiner

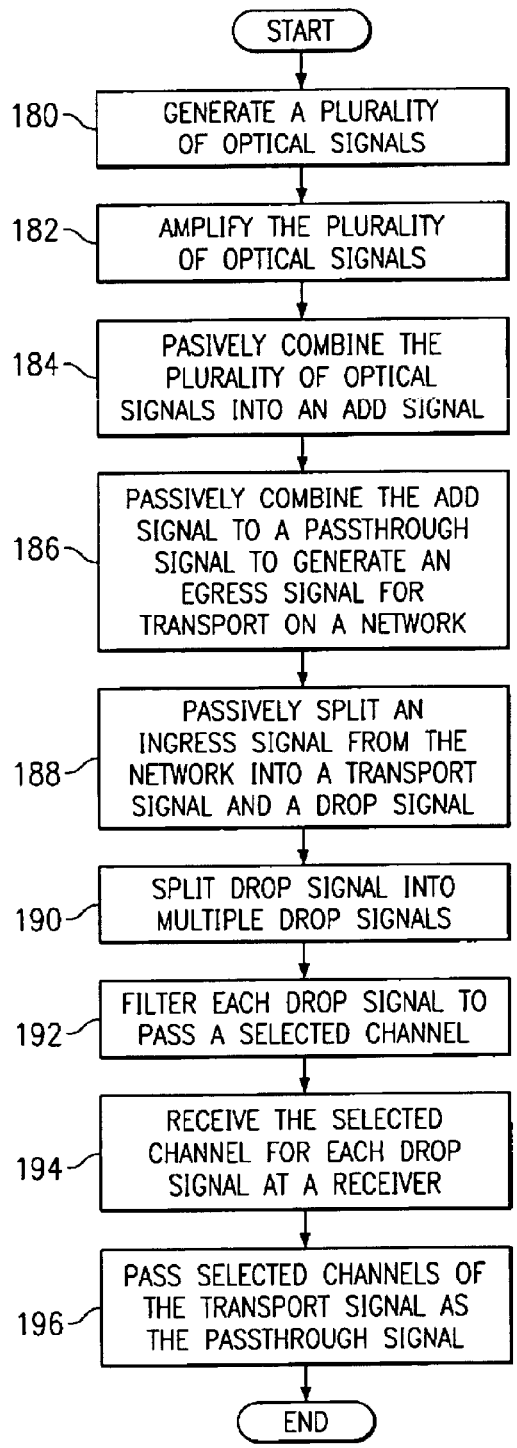
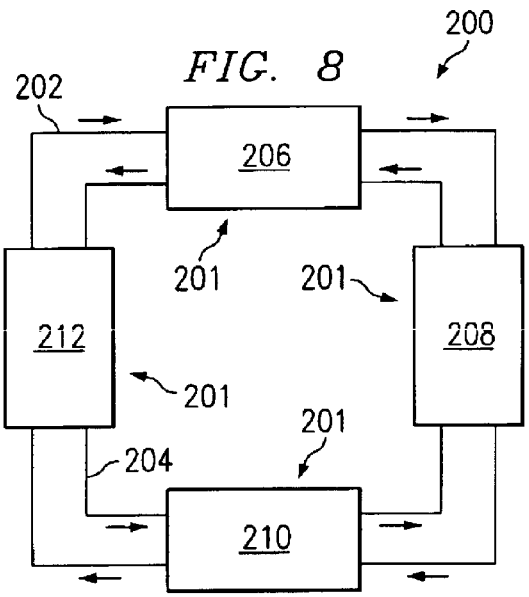
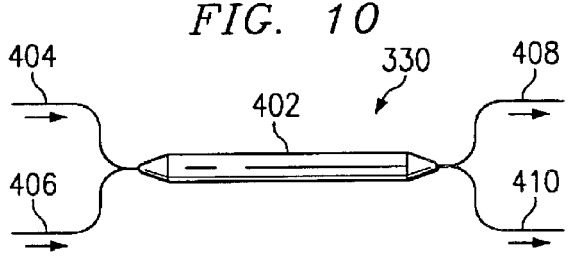

OPTICAL ADD/DROP NODE AND METHOD

TECHNICAL FIELD OF THE INVENTION

The present invention relates generally to optical transport systems, and more particularly to an optical add/drop node and method.

BACKGROUND OF THE INVENTION

Telecommunications systems, cable television systems and data communication networks use optical networks to rapidly convey large amounts of information between remote points. In an optical network, information is conveyed in the form of optical signals through optical fibers. Optical fibers comprise thin strands of glass capable of transmitting the signals over long distances with very low loss.

Optical networks often employ wavelength division multiplexing (WDM) or dense wavelength division multiplexing (DWDM) to increase transmission capacity. In WDM and DWDM networks, a number of optical channels are carried in each fiber at disparate wavelengths. Network capacity is based on the number of wavelengths, or channels, in each fiber and the bandwidth, or size of the channels. Arrayed waveguide gratings (AWGs), interleavers, and/or fiber gratings (FGs) are typically used to add and/or drop traffic at the multiplex and demultiplex network nodes.

SUMMARY OF THE INVENTION

The present invention provides an improved add/drop node and method that substantially eliminates or reduces the problems and disadvantages associated with previous systems and methods. In one embodiment, the node comprises combiners and distributors including tunable devices and passive splitters to transmit and receive signals at selectable and changeable wavelengths.

In accordance with one embodiment of the present invention, an optical add/drop node (OADN) comprises a network optical fiber carrying a signal on an optical network. A network drop splitter is coupled to the network optical fiber and to stages of drop splitters, the stages of drop splitters being operable to passively split an optical signal from the network drop splitter into multiple copies of the signal. The OADN further comprises at least one filter operable to receive at least a copy of the signal from at least one drop splitter to create a filtered copy, and further comprises at least one broadband receiver operable to receive the filtered copy from the filter.

Technical advantages of the present invention include providing an add/drop node and method. In accordance with various embodiments, the present invention provides an optical add/drop node with no channel spacing restriction and flexibility of wavelength assignment Another technical advantage of the present invention includes providing a photonic network with flexible channel spacing and no band-pass narrowing. Accordingly, the network is operable to accommodate various date-rate services (150 Mb/s, 600 Mb/s, 2.4 Gb/s, 10 Gb/s, and 40 Gb/s) and various modulation schemes (direct modulation and external modulation) with minimal reconfiguration.

Yet another advantage of the present invention is providing an OADN of relatively simple and low-cost construction. In particular, the OADN does not require potentially expensive and complicated cross-connect switches.

It will be understood that the various embodiments of the present invention may include some, all, or none of the enumerated technical advantages. In addition, other technical advantages of the present invention may be readily apparent to one skilled in the art from the following figures, description and claims.

BRIEF DESCRIPTION OF THE DRAWINGS

For a more complete understanding of the present invention and its advantages, reference is now made to the following description taken in conjunction with the accompanying drawings, wherein like numerals represent like parts, in which:

FIG. 7 is a flow diagram illustrating a method of adding and dropping channels to and from a network in accordance with one embodiment of the present invention;

FIG. 8 is a block diagram illustrating an optical network in accordance with another embodiment of the present invention;

FIG. 10 is a block diagram illustrating details of an optical coupler of the node of FIG. 9 in accordance with one embodiment of the present invention;

DETAILED DESCRIPTION OF THE INVENTION

Figure 1:
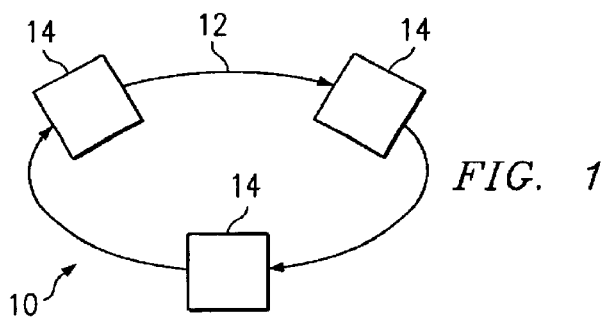
FIG. 1 is a block diagram illustrating an optical ring network in accordance with one embodiment of the present invention.

FIG. 1 is a block diagram illustrating an optical ring network in accordance with one embodiment of the present invention. In this embodiment, the network 10 is an optical network in which a number of optical channels are carried over a common path at disparate wavelengths. The network 10 may be a wavelength division multiplexing (WDM), dense wavelength division multiplexing (DWDM), or other suitable multi-channel network. The network 10 may be used in a short haul metropolitan network, a long haul inner city network, or any other suitable network or combination of networks.

Referring to FIG. 1, the network 10 includes a fiber optical ring 12 and a plurality of optical add/drop nodes (OADNs) 14. Optical information signals are transmitted on the ring 12 and have at least one characteristic modulated to encode audio, video, textual, real-time, non-real-time, and/or other suitable data. Modulation may be based on phase shift keying (PSK), intensity modulation (IM), and other suitable methodologies.

The OADNs 14 are operable to passively add and drop signals from the ring 12 and to terminate selected channels allowing for the reuse of those channels. At each OADN, traffic from local clients is added to the ring 12 while traffic destined for local traffic is dropped.

Figure 2:
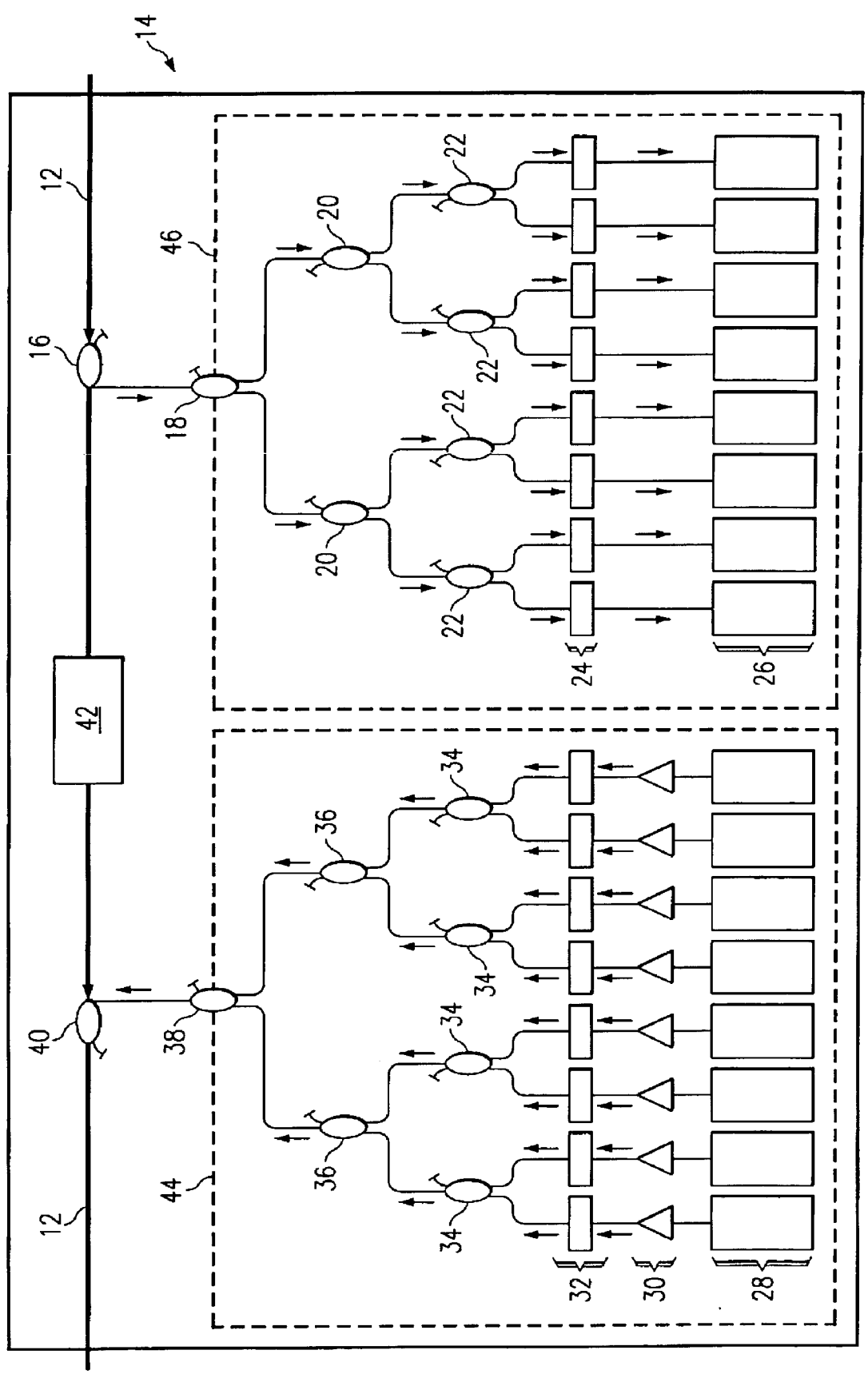
FIG. 2 is a block diagram illustrating an add/drop node in accordance with one embodiment of the present invention.

FIG. 2 is a block diagram illustrating an OADN 14 of FIG. 1 in accordance with one embodiment of the present invention. In the illustrated embodiment, the OADN 14 includes a channel reuse module, which may be omitted in other embodiments. It will be understood that, although a ring network is illustrated in FIG. 1, the OADN 14 may also be used in line or other non-ring networks.

Referring to FIG. 2, the OADN 14 comprises a network drop splitter 16, a channel reuse module 42, and a network add splitter 40 on the ring 12. The OADN 14 also comprises a combiner 44 and a distributor 46. The drop splitter 16 and the add splitter 40 may each be an optical coupler as described in more detail in reference to FIG. 10, below. As used herein, the term "each" means every one of at least a subset of the identified items.

The combiner 44 may comprise transponders 28, amplifiers 30, noise filters 32, and a plurality of slitters 34, 36, and 38. The distributor 46 may comprise a plurality of splitters 18, 20, and 22, filters 24, and receivers 26. In a particular embodiment, filters 24 comprise tunable filters, and the receivers 26 may comprise broadband receivers. Transponders 28 may comprise transmitters and/or other suitable elements in addition to transmitters.

The splitters 18, 20, 22, 34, 36, and 38 may each be an optical coupler as described in more detail in reference to FIG. 10, below. As used herein, the terms "coupler" and "splitter" may be used interchangeably to describe the coupler described in FIG. 10.

In the illustrated embodiment, the splitters of the combiner 44 and the distributor 46 are arranged in stages comprising a dendritic, or tree-branch-like, pattern. The combiner 44 may be a passive combiner and the distributor 46 may be a passive distributor. "Passive" in this context means the splitting or combining of signals without power, electricity, and/or moving parts. An active device would thus use power, electricity or moving parts to perform work. It will be understood that, for example, amplification laser light or energy may be added via an input lead of the passive splitter and the splitter would still be considered "passive" under this definition. A passive combiner or distributor may allow for the maintaining of flexible channel spacing while splitting or combining.

Channel reuse module 42 may include multiplexers, demultiplexers, optical switches, and/or other components and may be operable to terminate selected wavelengths, or channels, thus allowing the adding of further traffic comprising those channels without causing channel interference in the ring. Further details regarding the channel reuse module 42 in various embodiments are discussed in reference to FIGS. 3A–3D.

In operation, a plurality of optical signals are generated and transmitted from the transponders 28 and amplified via the amplifiers 30. Noise filters 32 may be tunable filters operable to reduce the noise caused by the amplification. In an alternative embodiment, noise filters 32 may be omitted. The staged add splitters 34, 36, and 38 combine the plurality of optical signals into an add signal. The add signal is passively combined to a passthrough signal on the optical fiber 12 via ring add coupler 40 for transport on the network.

An ingress optical signal is received at OADN 14 and passively split by ring drop splitter 16 into two signals: a transport signal and a drop signal. The ingress optical splitter may be a combined signal. A "combined signal" in this context may be a multiplexed or other signal comprising a plurality of traffic streams in a plurality of channels, or wavelengths. The staged drop splitters 18, 20, and 22 passively split the drop signal into multiple drop signals. The multiple drop signals may be copies of the drop signal. A "copy" in this context may be a signal that comprises the same traffic content as the original signal, but that may differ in power or energy levels from the original signal or from other copies of the original signal. Filters 24 are operable to filter a selected channel from the drop signals. Broadband receivers 26 receive the selected channel.

Channel reuse module 42 receives the transport signal from ring drop splitter 16 and passes only selected channels of the transport signal as the passthrough signal. In a particular embodiment, specific channels received at receivers 26 may not be passed through, or may be terminated at, channel reuse module 42, thus allowing the adding of further traffic comprising those channels without causing channel interference. In accordance with other embodiments of the present invention, channel reuse module 42 may be omitted if, for example, wavelength reuse is not necessary.

In this way, traffic may be passively added to and/or dropped from the ring by splitting/combining, which is without multiplexing/demultiplexing, in the transport rings and/or separating parts of a signal in the ring. As described above, "passive" in this context means the splitting or combining of signals without power, electricity, and/or moving parts. An active device would thus use power, electricity or moving parts to perform work. The passive splitters maintain flexible channel spacing within the ring 12 and the distributor allows for the selection of any channel dropped from the ring 12. It will be understood that, for example, amplification laser light or energy may be added via an input lead of the passive splitter and the splitter would still be considered "passive" under this definition.

Figure 3D:
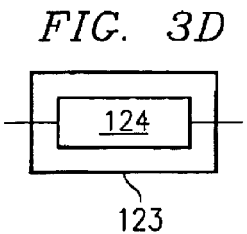
FIG. 3D is a block diagram illustrating a channel reuse module in accordance with yet another embodiment of the present invention.
Figure 3A:
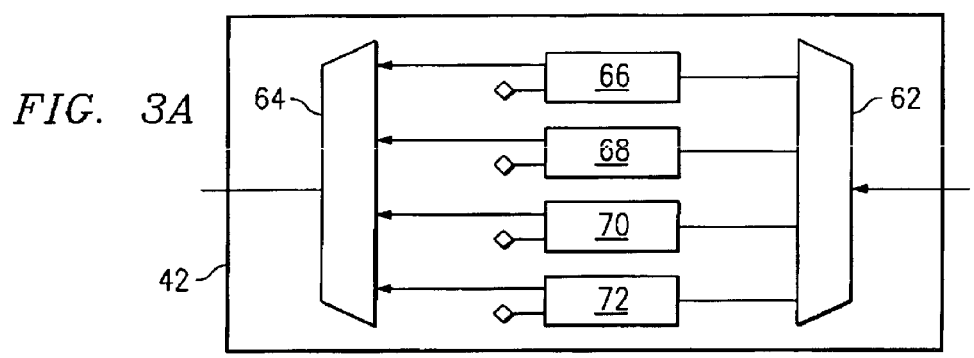
FIG. 3A is a block diagram illustrating a channel reuse module of the node of FIG. 2 in accordance with one embodiment of the present invention.

FIG. 3A is a block diagram illustrating a channel reuse module 42 of FIG. 2 in accordance with one embodiment of the present invention. In this embodiment, each wavelength or channel is demultiplexed from the signal and either passed through or terminated.

Referring to FIG. 3A, the channel reuse module 42 comprises demultiplexer 62, multiplexer 64, and optical switches 66, 68, 70, and 72. Demultiplexer 62 and multiplexer 64 may comprise arrayed wave guides or other suitable demultiplexers/multiplexers.

In operation, the optical signal carried on the ring 12 is demultiplexed by the demultiplexer 62. Each channel is separately passed to the optical switches 66, 68, 70, or 72. Selected channels may then be terminated by the optical switches 66, 68, 70, or 72. Remaining channels are then multiplexed by the multiplexer 64. The terminated channels may be reused within the network. Thus, for example, channels dropped at the node 14 may be terminated to allow for reuse of the dropped channels.

Figure 3B:
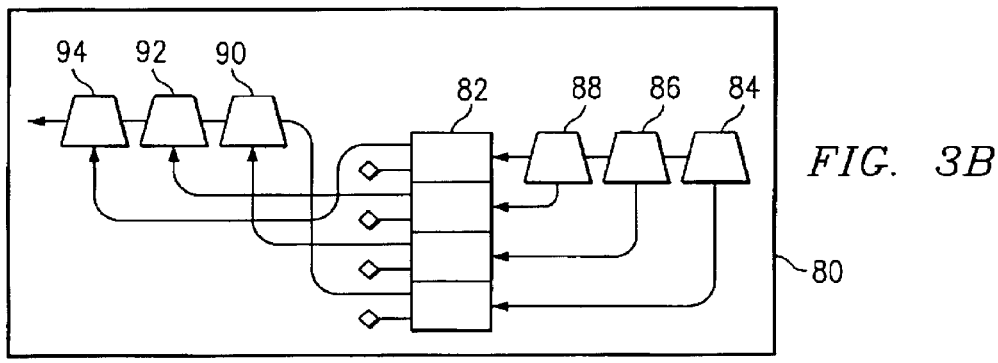
FIG. 3B is a block diagram illustrating a channel reuse module in accordance with another embodiment of the present invention.

FIG. 3B is a block diagram illustrating a channel reuse module in accordance with another embodiment of the present invention. In this embodiment, the channels comprising the signal are separated into groups, or bands.

Referring to FIG. 3B, the channel reuse module 80 comprises optical switches 82 and band path filters 84, 86, 88, 90, 92, and 94.

In operation, the band path filters are operable to filter groups of channels and allow other groups of channels to pass through. The groups may comprise contiguous channels, odd and even channels, or other groupings. Thus, for example, the signal may be divided into sixteen channels, λ1 through λ16 grouped into four path groups: λ1-4, λ5-8, λ9-12, and λ13-16. Band pass filter 84 may filter λ1-4, band pass filters 86 and 90 may filter λ5-8, band pass filters 88 and 92 may filter λ9-12, and band pass filter 94 may filter λ13-16. Optical switches 82 are operable to allow for the termination of any of these four groups while allowing other groups to pass through.

Figure 3C:
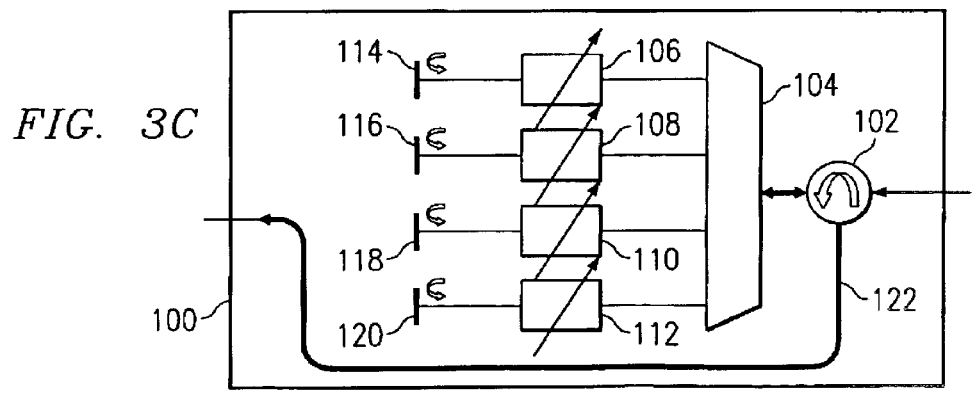
FIG. 3C is a block diagram illustrating a channel reuse module in accordance with yet another embodiment of the present invention.

FIG. 3C is a block diagram illustrating a channel reuse module in accordance with yet another embodiment of the present invention. In this embodiment, signals are terminated by attenuation, rather than via optical switches.

Referring to FIG. 3C, the channel reuse module 100 comprises a circulator 102, a demultiplexer 104, optical attenuators 106, 108, 110, and 112, mirrors 114, 116, 118, and 120, and optical fiber 122. Circulator 102 may comprise a three pole circulator, and allows for the optical signal to travel from the optical ring to the demultiplexer 104.

In operation, demultiplexer 104 demultiplexes the signals into its component channels. The WDM signal from the right side splits into each wavelength in the demultiplexer 104. Each wavelength travels through an attenuator and is reflected by a mirror. A wavelength may be terminated by setting the maximum volume of an attenuator or the wavelength can flow through with a minimum of insertion loss if the volume of the attenuator is minimized.

It will be understood that in accordance with other embodiments of the present invention, the channel reuse module of the node 14 of the present invention may also comprise an optical cross-connect or other similar switching module. In such an embodiment or in other alternative embodiments, the drop splitter 16 and add coupler 40 may be eliminated and the add and drop leads connected directly to the channel reuse module.

FIG. 3D is a block diagram illustrating a channel reuse module in accordance with yet another embodiment of the present invention. In this embodiment, signals are passed through or terminated via a thin-film type or other suitable filter.

Referring to FIG. 3D, the channel reuse module 123 comprises thin-film type or other suitable filter 124.

In operation, specific optical signals may be terminated or passed through. For example, all even-numbered channels ($\lambda_2, \lambda_4, \lambda_6$ ... etc.) channels may be terminated and all odd channels ($\lambda_1, \lambda_3, \lambda_5$ ... etc.) passed through, or vice versa. The terminated channels may be reused within the network. Channel rejection characteristics of filter 124 may be tunable or fixed in accordance with various embodiments.

Figure 4A:
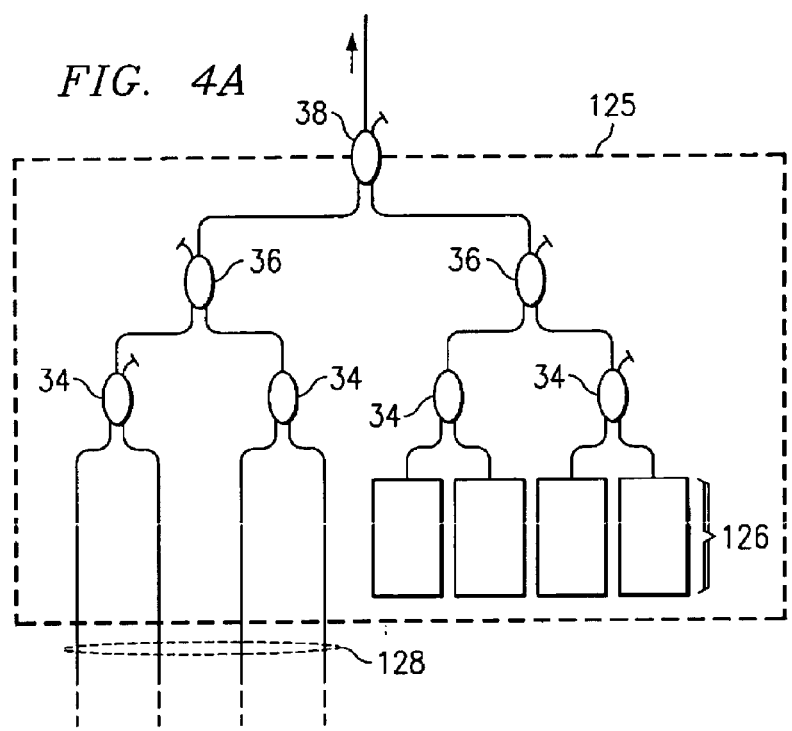
FIG. 4A is a block diagram illustrating a combiner of the node of FIG. 2 in accordance with another embodiment of the present invention.

FIG. 4A is a block diagram illustrating a combiner 125. In accordance with a particular embodiment of the present invention, combiner 125 may be used in place of combiner 44 of FIGS. 2, 8, or 19.

Referring to FIG. 4A, combiner 44 comprises couplers 34, 36, and 38 disposed in a dendritic pattern as described above in reference to FIG. 2. However, a portion 128 of the add leads are not connected to transponders or amplifiers and may forward signals from external SONET or other networks (not shown). The remaining add leads may forward signals from transponders 126 which may comprise or transponders which each comprise a transponder and an amplifier combined integrally into a single unit. In another embodiment, transponders 126 may comprise only transponders. A combiner comprising only transponders and couplers may be particularly suited in, for example, a combiner comprising four or another small number of transponders and/or amplifiers. In such a combiner, noise filters may not be necessary due to a relatively low noise from the smaller number of transponders and/or amplifiers. In another embodiment, high-output transponders may reduce or eliminate the need for further amplification from stand-alone or integral amplifiers.

Figure 4B:
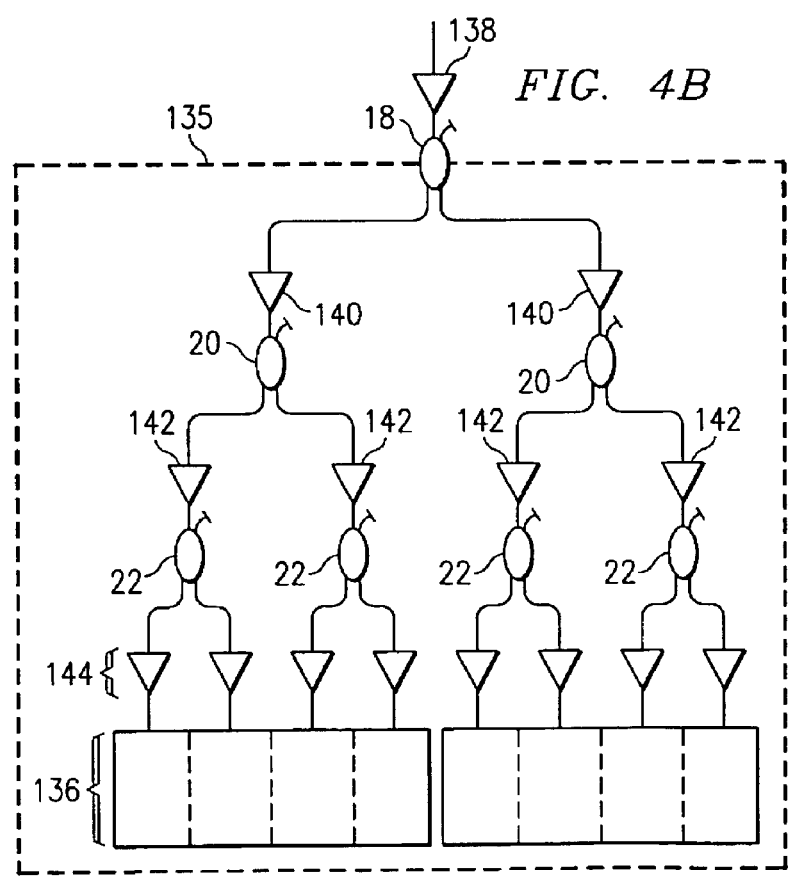
FIG. 4B is a block diagram illustrating a distributor of the node of FIG. 2 in accordance with another embodiment of the present invention.

FIG. 4B is a block diagram illustrating a distributor 135. In accordance with a particular embodiment of the present invention, distributor 135 may be used in place of distributor 46 of FIGS. 2, 8, or 19.

Referring to FIG. 4B, distributor 135 comprises couplers 18, 20, and 22 as described above in reference to FIG. 2. Acoustic optical tunable filters (AOTFs) 136 may comprise arrays of filters and receivers which receive the signals from the couplers filter a selected channel. In addition, amplifiers 138, 140, 142, and 144 may be disposed as shown to amplify the distributed signal. In accordance with various embodiments, some, none, or all of amplifiers 138, 140 and 142 may be used. For example, in a particular embodiment, a single amplifier 138 may amplify the signal before being split by coupler 18 and may provide sufficient amplification for the distributor at a relatively low cost. In another embodiment, amplifiers 144 may be provided as shown, with the advantage that, in the event of the failure of a one or more of the amplifiers, the remaining amplifiers may continue to provide amplification.

Figure 5:
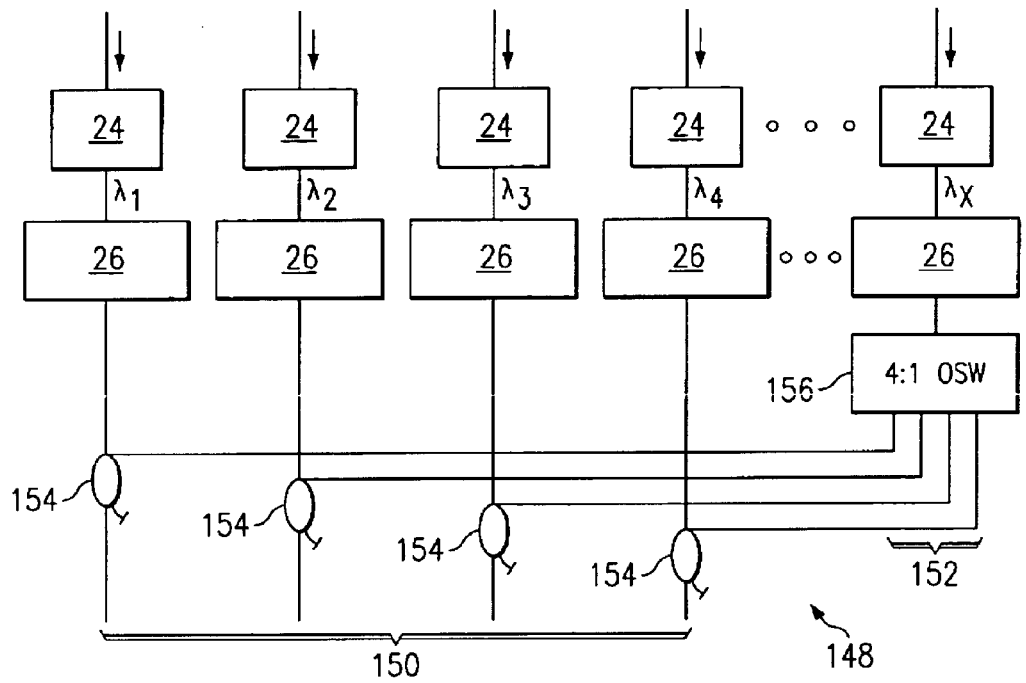
FIG. 5 is a block diagram illustrating a receiver arrangement in accordance with one embodiment of the present invention.

FIG. 5 is a block diagram illustrating a receiver arrangement of the distributor 46 in accordance with one embodiment of the present invention. In this embodiment, a redundant receiver adds protection functionality in the event of a failure of one or more of the filters and receivers of the distributor 46.

Referring to FIG. 5, the receiver arrangement 148 comprises tunable filters 24 and receivers 26 of the distributor 46 as described above in reference to FIG. 2. A set 150 of the filters 24 and receivers 26 are provisioned so as to pass a selected channel to the receivers. A redundant filter/receiver set 152 may be tuned to any one of the channels received by the set 150 in the event of a failure of one of the filters or receivers of the sets 150, and, in such an event, module 156 may direct traffic from set 152 to the appropriate drop lead via one of couplers 154. Module 156 may comprise a 4:1 optical switch or another suitable means to select a signal or signals.

Figure 6:
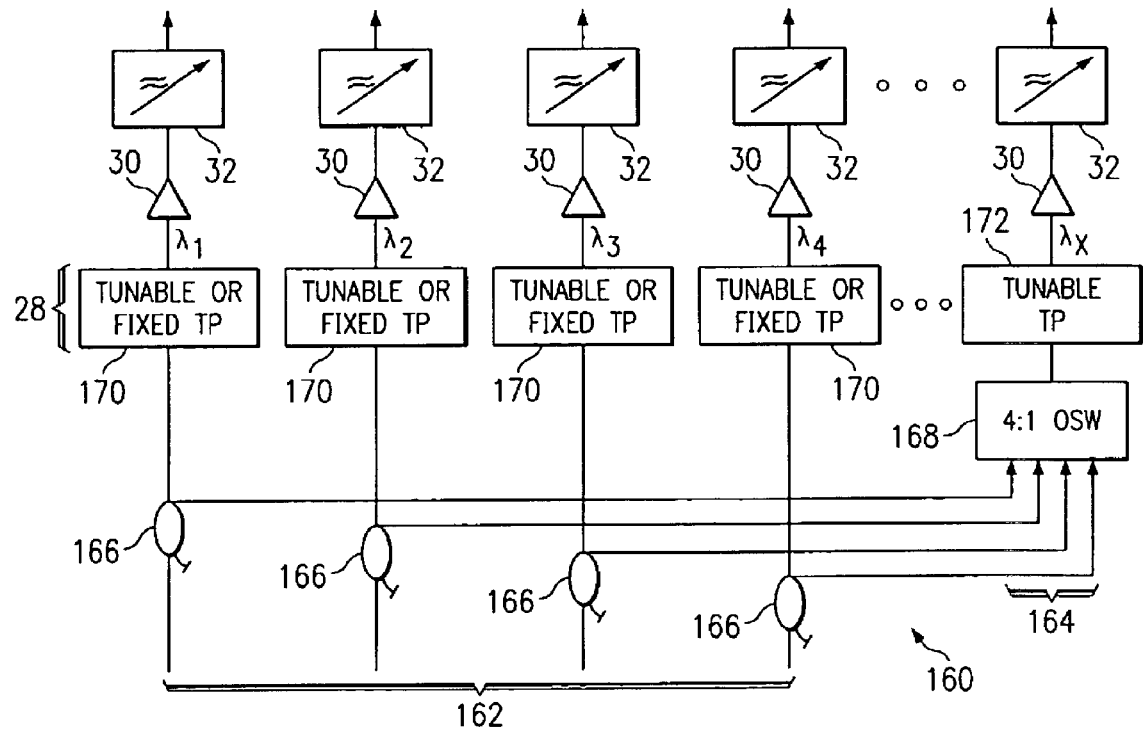
FIG. 6 is a block diagram illustrating a transmitter arrangement in accordance with one embodiment of the present invention.

FIG. 6 is a block diagram illustrating a transmitter arrangement in a combiner 44 in accordance with one embodiment of the present invention. In this embodiment, a redundant transponder adds protection functionality in the event of a failure of one or more of the transponders, amplifiers, and filters of the combiner 44.

Referring to FIG. 6, the transmitter arrangement 160 comprises transponders 28, amplifiers 30, and filters 32 as described above in reference to FIG. 2. Arrangement 160 further comprises splitters 166 and 4:1 optical switch 168. A set 162 of the transponders 28 (designated 170), amplifiers 30, and filters 32 are provisioned so as to receive signals from splitter 166 and to transmit a selected channel to the remainder of the combiner 44. In this embodiment, each transponder 170 of the set 162 may be either a tunable or a fixed transponder. A redundant transponder/amplifier/filter set 164 comprises a tunable transponder 172.

In the event of a failure of one of the units within set 162, module 168 may select a signal corresponding to the failed unit and transmit that signal to the tunable transponder 172 for transmittal to the network. Module 168 may comprise a 4:1 optical switch or other suitable means to select a signal or signals.

Filters 32 may comprise tunable or fixed filters. For example, if transponders 170 comprise fixed transponders, then filters 32 may comprise fixed filters. If, however, transponders 170 comprise tunable transponders, then filters 32 may comprise tunable filters. In accordance with other embodiments, amplifiers 30 and/or filters 32 may be omitted.

FIG. 7 is a flow diagram illustrating a method of adding and dropping channels to and from a network in accordance with one embodiment of the present invention.

Referring to FIG. 7, the method begins with step 180 wherein a plurality of optical signals are generated by and transmitted from a plurality of transponders. The optical signals are amplified at step 182. In other embodiments, the amplification step may be omitted. Proceeding to step 184, an add signal is formed by passively combining the plurality of optical signals via passive splitters. Proceeding to step 186, the add signal is combined with a passthrough signal on the ring of the network to generate an egress signal for transport on the network. In this way, the plurality of optical signals is added to the network while maintaining flexible channel spacing within the network.

Proceeding to step 188 an ingress optical signal from the network ring is passively split into two parts: a transport signal and a drop signal. At step 190, the drop signal into multiple drop signals with a distributor.

Proceeding to step 192, each trop signal is filtered in the distributor to pass a selected channel to the receivers of the distributor. At step 194, the selected channel is received at a broadband receiver.

Finally, at step 196, the channel reuse module passes selected channels of the transport signal as the passthrough signal, and the method has reached its end.

FIG. 8 illustrates an optical network 200 in accordance with one embodiment of the present invention. In this embodiment, the optical network 200 is a flexible open ring network.

Referring to FIG. 8, the network 200 includes a first fiber optic ring 202 and a second fiber optic ring 204 connecting nodes 206, 208, 210, and 212. An optical ring may include, as appropriate, a single, unidirectional fiber, a single, bi-directional fiber, or a plurality of uni- or bi-directional fibers. As with network 10, network 200 is an optical network in which a number of optical channels are carried over a common path at disparate wavelengths. The network 200 may be a wavelength division multiplexing (WDM), dense wavelength division multiplexing (DWDM), or other suitable multi-channel network. The network 200 may be used in a short-haul metropolitan network, and long-haul inter-city network or any other suitable network or combination of networks.

In network 200, optical information signals are transmitted in different directions on the rings 202 and 204 to provide fault tolerance. The optical signals have at least one characteristic modulated to encode audio, video, textual, real-time, non-real-time and/or other suitable data. Modulation may be based on phase shift keying (PSK), intensity modulation (IM) and other suitable methodologies.

In the illustrated embodiment, the first ring 202 is a clockwise ring in which traffic is transmitted in a clockwise direction. The second ring 204 is a counterclockwise ring in which traffic is transmitted in a counterclockwise direction. The nodes 201 are each operable to add and drop traffic to and from the rings 202 and 204. In particular, each node 201 receives traffic from local clients and adds that traffic to the rings 202 and 204. At the same time, each node 201 receives traffic from the rings 202 and 204 and drops traffic destined for the local clients. In adding and dropping traffic, the nodes 201 may multiplex data from clients for transmittal in the rings 202 and 204 and may demultiplex channels of data from the rings 202 and 204 for clients.

As previously described in connection with network 10, traffic may be added to the rings 202 and 204 by inserting the traffic channels or otherwise combining signals of the channels into a transport signal of which at least a portion is transmitted on a ring. Traffic may be dropped by making the traffic available for transmission to the local clients. Thus, traffic may be dropped and yet continue to circulate on a ring.

In a particular embodiment, traffic is passively added to and passively dropped from the rings 202 and 204. In this embodiment, channel spacing is flexible in the rings 202 and 204 and the node elements on the rings 202 and 204 need not be configured with channel spacing. Thus, channel spacing may be set by and/or at the add/drop receivers and senders of the nodes 201 coupled to the client. The transport elements of the nodes 201 communicate the received traffic on the rings 202 and 204 regardless of the channel spacing of the traffic.

Each ring 202 and 204 has a terminating point such that the rings 202 and 204 are "open" rings. The opening in the rings 202 and 204 may be a physical opening, an open, crossed, or other non-closed switch, a deactivated transmission device or other obstruction operable to completely or effectively terminate, and thus remove channels from the rings 202 and 204 at the terminal points such that interference of each channel with itself due to recirculation is prevented or minimized such that the channels may be received and decoded within normal operating limits.

In one embodiment, the rings 202 and 204 are open, and thus terminate, in the nodes 201. In a particular embodiment, the rings 202 and 204 may terminate in neighboring nodes 201 at corresponding points along the rings 202 and 204. Terminal points in the rings 202 and 204 may be corresponding when, for example, they are between add and/or drop devices of two neighboring nodes or when similarly positioned within a same node. Further details regarding the open ring configuration are described below in reference to FIG. 11.

Figure 9:
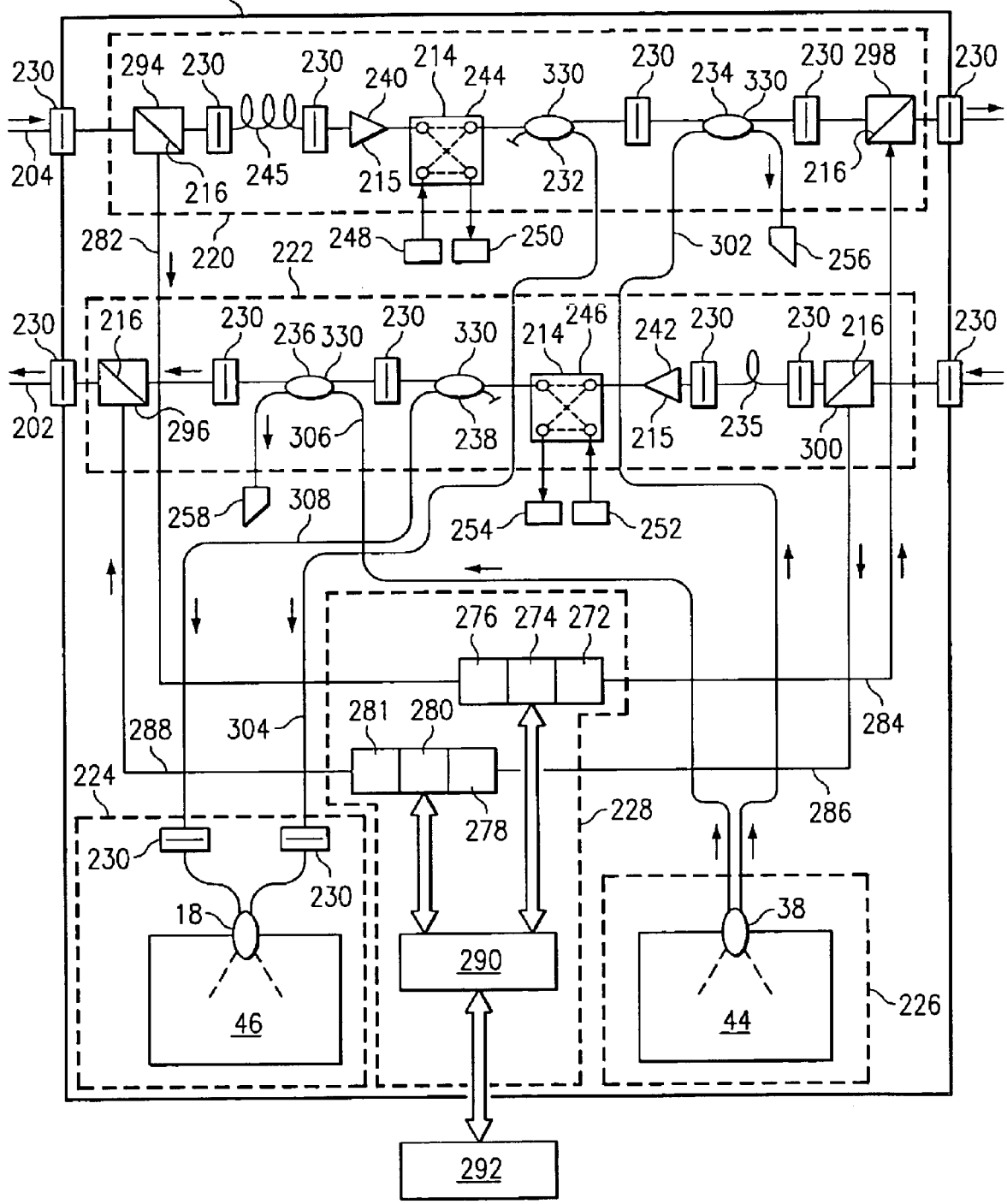
FIG. 9 is a block diagram illustrating details of a node of the network of FIG. 8 in accordance with one embodiment of the present invention.

FIG. 9 illustrates details of the node 201 in accordance with one embodiment of the present invention. In this embodiment, optical supervisory channel (OSC) traffic is transmitted in an external band separate from the revenue-generating traffic. In a particular embodiment, the OSC signal is transmitted at a wavelength of 1510 nanometers (nm).

Referring to FIG. 9, the node 201 comprises counterclockwise transport element 220, clockwise transport element 222, distributing element 224, combining element 226, and managing element 228. In one embodiment, the elements 220, 222, 224, 226 and 228 as well as components within the elements may be interconnected with optical fiber links. In other embodiments, the components may be implemented in part or otherwise with planar waveguide circuits and/or free space optics. In addition, as described in connection with nodes 12, the elements of node 201 may each be implemented as one or more discrete cards within a card shelf of the node 201. Exemplary connectors 230 for a card shelf embodiment are illustrated by FIG. 9. The connectors 230 may allow efficient and cost effective replacement of failed components. It will be understood that additional, different and/or other connectors may be provided as part of the node 201.

Transport elements 220 and 222 may each comprise passive couplers or other suitable optical splitters/couplers 330, ring switch 214, amplifier 215, and OSC filters 216. Optical splitters/couplers 330 may comprise splitters/couplers 330 or other suitable passive device. Ring switch 214 may be a 2×2 or other switch operable to selectively open the connected ring 202 or 204. In the 2×2 embodiment, the switch 214 includes a "cross" or open position and a "through" or closed position. The cross position may allow for loopback, localized and other signal testing. The open position allows the ring openings in the nodes 201 to be selectively reconfigured to provide protection switching.

Amplifier 215 may comprise an EDFA or other suitable amplifier. In one embodiment, the amplifier is a preamplifier and may be selectively deactivated to open a connected ring 202 or 204 to provide protection switching in the event of failure of the adjacent switch 214. Because the span loss of clockwise ring 202 usually differs from the span loss of counterclockwise ring 204, the amplifier 215 may use an ALC function with wide input dynamic-range. Hence, the amplifier 215 may deploy automatic gain control (AGC) to realize gain-flatness against input power variation. The preamplifier 215 and the switch 214 are disposed in the transport elements 220 and 222 inside of the OSC filters 216 and between the ingress OSC filter 216 and the add/drop splitters/couplers 330. Thus, the OSC signal may be recovered regardless of the position of switch 214 or operation of preamplifier 215. In another embodiment, OSC signals may be transmitted in-band with revenue-generating traffic by placing an OSC filter between the couplers 232 and 234 and between the couplers 236 and 238. OSC filters 216 may comprise thin film type, fiber grating or other suitable filters.

In the specific embodiment of FIG. 8, counterclockwise transport element 220 includes a passive optical splitter set having a counterclockwise drop coupler 232 and a counterclockwise add coupler 234. The counterclockwise transport element 220 further includes OSC filters 294 and 298 at the ingress and egress edges, counterclockwise amplifier 240 between the ingress OSC filter 294 and drop coupler 232 and counterclockwise ring switch 244 between amplifier 240 and drop coupler 232. Thus, the switch 244 in this embodiment is on the ingress side of the transport element and/or drop coupler. The counterclockwise transport element 220 may also include a dispersion compensation fiber (DCF) segment 235 to provide dispersion control. In one embodiment, DCF segment 235 may be included where the network 200 operates at rates at or above 2.5 G and/or the previous node is greater than a short hop on the connected ring.

Clockwise transport element 222 includes a passive optical splitter set including clockwise add coupler 236 and clockwise drop coupler 238. Clockwise transport element 222 further includes OSC filters 296 and 300, clockwise amplifier 242, and clockwise ring switch 246. OSC filters 296 and 300 are disposed at the ingress and egress edges of the clockwise transport element 222. The clockwise amplifier 242 is disposed between the ingress OSC filter 300 and the drop coupler 238 while the clockwise ring switch 246 is disposed between the amplifier 242 and the drop coupler 238. Thus, the switch 246 in this embodiment is on the ingress side of the transport element and/or drop coupler. The clockwise transport element 222 may also include a DCF segment 245 to provide dispersion compensation depending, as previously discussed, on the data transport rate and/or the length of the span to the previous node.

Distributing element 224 may comprise a drop coupler 18 feeding into the distributor 46. Details regarding drop coupler 18 and distributor 46 are described above in reference to FIG. 2. In other embodiments, distributor 135 of FIG. 4B or another suitable distributor may be used in place of distributor 46.

Combining elements 226 may comprise combiner 44 feeding into coupler 38. Details of combiner 44 and coupler 38 are described above in reference to FIG. 2. In other embodiments, combiner 125 of FIG. 4A or another suitable combiner may be used in place of distributor 46.

Managing element 228 may comprise OSC senders 272 and 281, OSC interfaces 274 and 280, OSC receivers 276 and 278, and an element management system (EMS) 290. Each OSC sender, OSC interface and OSC receiver set forms an OSC unit for one of the rings 202 or 204 in the node 201. The OSC units receive and transmit OSC signals for the EMS 290. The EMS 290 may be communicably connected to a network management system (NMS) 292. NMS may reside within node 201, in a different node, or external to all of the nodes 201.

EMS 290, NMS 292 and/or other elements or parts of node 201 or network 200 may comprise logic encoded in media for performing network and/or node monitoring, failure detection, protection switching and loopback or localized testing functionality of the network 200. Logic may comprise software encoded in a disk or other computer-readable medium and/or instructions encoded in an application specific integrated circuit (ASIC), field programmable gate array (FPGA), or other processor or hardware. It will be understood that functionality of EMS 290 and/or NMS 292 may be performed by other components of the network 200 and/or be otherwise distributed or centralized. For example, operation of NMS 292 may be distributed to the EMS of nodes 201 and the NMS omitted. Similarly, the OSC units may communicate directly with NMS 292 and EMS 290 omitted.

The node 201 further comprises counterclockwise add fiber segment 302, counterclockwise drop fiber segment 304, clockwise add fiber segment 306, clockwise drop fiber segment 308, OSC fiber segments 282, 284, 286, and 288, and optical spectrum analyzer (OSA) connectors 250, 254, 256, and 258. The OSA connectors may be angled connectors to avoid reflection. Test signal may sometimes be fed into the network from connectors 248 and 252. As previously described, a plurality of passive physical contact connectors 230 may be included where appropriate so as to communicably connect the various elements of node 201.

In operation, the transport elements 220 and 222 are operable to passively add local traffic to the rings 202 and 204 and to passively drop at least local traffic from the rings 202 and 204. The transport elements 220 and 222 may further be operable to passively add and drop the OSC signal to and from the rings 202 and 204. More specifically, in the counterclockwise direction, OSC filter 294 processes an ingress optical signal from counterclockwise ring 204. OSC filter 294 filters OSC signal from the optical signal and forwards the OSC signal to the OSC interface 274 via fiber segment 282 and OSC receiver 276. OSC filter 294 also forwards or lets pass the remaining transport optical signal to amplifier 240. By placing the OSC filter 294 outside of the ring switch 244, the node 201 is able to recover the OSC signal regardless of the position of the ring switch 244.

Amplifier 240 amplifies the signal and forwards the signal to ring switch 244. Ring switch 244 is selectively operable to transmit the optical signal to coupler 232 when the ring switch 244 is set to the through (closed) setting, or to transmit the optical signal to OSA connector 250 when the ring switch 244 is set to the cross (open) setting. Further details regarding the OSA connectors are described below.

If ring switch 244 is set in the cross position, the optical signal is not transmitted to couplers 232 and 234, the ring 204 is open at the node 201, and dropping of traffic from the ring 204 does not occur at node 201. However, adding of traffic at node 201 occurs and the added traffic flows to the next node in the ring 204. If the ring switch 244 is set in the through position, the optical signal is forwarded to couplers 232 and 234 and adding and dropping of traffic to and from the ring 204 may occur at node 201.

Coupler 232 passively splits the signal from switch 244 into two generally identical signals. A passthrough signal is forwarded to coupler 234 while a drop signal is forwarded to distributing element 224 via segment 304. The signals may be substantially identical in content and/or energy. Coupler 234 passively combines the passthrough signal from coupler 232 and an add signal comprising local add traffic from combining element 226 via fiber segment 302. The resulting signal is passed to OSC filter 298.

OSC filter 298 adds an OSC signal from the OSC interface 274, via the OSC sender 272 and fiber segment 284, to the combined optical signal and forward the resulting signal as an egress transport signal to ring 204. The added OSC signal may be locally generated data or may be received OSC data passed through the EMS 290.

In the clockwise direction, OSC filter 300 receives an ingress optical signal from clockwise ring 202. OSC filter 300 filters the OSC signal from the optical signal and forwards the OSC signal to the OSC interface 280 via fiber segment 286 and OSC receiver 278. OSC filter 300 also forwards the remaining transport optical signal to amplifier 242.

Amplifier 242 amplifies the signal and forwards the signal to ring switch 246. Ring switch 246 is selectively operable to transmit the optical signal to coupler 238 when the ring switch 246 is set to the through setting, or to transmit the optical signal to OSA connector 254 when the ring switch 246 is set to the cross setting.

If the ring switch 246 is set in the cross position, the optical signal is not transmitted to couplers 238 and 236, the ring 204 is open at the node 201, and dropping of traffic from the ring 202 does not occur at node 201. However, adding of traffic to the ring 202 occurs at node 201. If the ring switch 246 is set in the through position, the optical signal is forwarded to couplers 238 and 236 and adding and dropping of traffic to and from the ring 202 may occur at node 201.

Coupler 238 passively splits the signal from switch 246 into generally identical signals. A passthrough signal is forwarded to coupler 236 while a drop signal is forwarded to distributing unit 224 via segment 308. The signals may be substantially identical in content and/or energy. Coupler 236 passively combines the passthrough signal from coupler 238 and an add signal comprising local add traffic from combining element 226 via fiber segment 306. The resulting signal is passed to OSC filter 296.

OSC filter 296 adds an OSC signal from the OSC interface 280, via the OSC sender 281 and fiber segment 288, to the combined optical signal and forwards the signal as an egress transport signal to ring 202. As previously described, the OSC signal may be locally generated data or data passed through by EMS 290.

Prior to addition to the rings 202 and 204, locally-derived traffic is transmitted from combining element 226 wherein the signals are combined, amplified, and forwarded to the transport elements 220 and 222 via counterclockwise add segment 302 and clockwise add segment 306.

Locally-destined traffic is dropped to distributing element 224 and to distributor 46 therein from counterclockwise drop segment 304 and clockwise drop segment 308.

EMS 290 monitors and/or controls all elements in the node 201. In particular, EMS 290 receives an OSC signal in an electrical format via OSC filters 294, 296, 298 and 300, OSC receivers 276 and 278, OSC senders 272 and 281, and OSC interfaces 274 and 280. EMS 290 may process the signal, forward the signal and/or loopback the signal. Thus, for example, the EMS 290 is operable to receive the electrical signal and resend the OSC signal to the next node, adding, if appropriate, node-specific error information or other suitable information to the OSC.

In one embodiment each element in a node 201 monitors itself and generates an alarm signal to the EMS 290 when a failure or other problem occurs. For example, EMS 290 in node 201 may receive one or more of various kinds of alarms from the elements and components in the node 201: an amplifier loss-of-light (LOL) alarm, an amplifier equipment alarm, an optical receiver equipment alarm, optical sender equipment alarm, a distributing amplifier LOL alarm, a distributing amplifier equipment alarm, a combining amplifier LOL alarm, a combining amplifier equipment alarm, or other alarms. Some failures may produce multiple alarms. For example, a fiber cut may produce amplifier LOL alarms at adjacent nodes and also error alarms from the optical receivers.

In addition, the EMS 290 may monitor the wavelength and/or power of the optical signal within the node 210 via connections (not shown) between the OSA connectors 250, 254, 256, and 258 and an optical spectrum analyzer (OSA) communicably connected to EMS 290.

The NMS 292 collects error information from all of the nodes 201 and is operable to analyze the alarms and determine the type and/or location of a failure. Based on the failure type and/or location, the NMS 292 determines needed protection switching actions for the network 200. The protection switch actions may be carried out by NMS 292 by issuing instructions to the EMS 290 in the nodes 201. After a failure is fixed, the network 200 does not require reverting. Thus, the open ring network configuration does not change for protection switching, only the location of the openings. In this way, network operation is simplified and node programming and operation is cost minimized or reduced.

Error messages may indicate equipment failures that may be rectified by replacing the failed equipment. For example, a failure of one of the amplifiers in the distributing element may trigger a distributing amplifier alarm. The failed amplifier can then be replaced. A failed coupler in the distributing element may be likewise detected and replaced. Similarly, a failure of an optical receiver or sender may trigger an optical receiver equipment alarm or an optical sender equipment alarm, respectively, and the optical receiver or sender replaced as necessary. The optical sender should have a shutter or cold start mechanism. Upon replacement, no other switching or reversion from a switched state may be required. As described further below, the NMS 292 may in response to certain messages or combinations of messages trigger a protection switching protocol.

In another embodiment of the present invention, redundant ring switches may be provided in the transport elements. The redundant ring switches may allow for continued circuit protection in the event of switch failure and failed ring switches may be replaced without interfering the node operations or configuration. Ring switch failure may comprise, among other things, failure of a ring switch to change from the cross position to a through position, failure of a ring switch to change from a through position to the cross position, or the switch becoming fixed in an intermediate position. The redundant ring switches may thus allow for protection switching in the event that a switch fails to switch from the closed position to the open position. Furthermore, the cascaded switch configuration allows a switch operation test, because whenever one of the switches has the cross position, the other switches' position does not affect the network traffic. Alternatively, redundancy in the event of a switch stuck in the closed position can be accomplished without a redundant switch by turning off the amplifier for that ring in the node with the failed switch, thus effectively terminating the signal at the amplifier.

FIG. 10 illustrates details of an optical splitter/coupler 330 in accordance with one embodiment of the present invention. In the embodiment, the optical splitter/coupler 330 is a fiber coupler with two inputs and two outputs. The optical splitter/coupler 330 may in other embodiments be combined in whole or in part with a waveguide circuit and/or free space optics. It will be understood that the splitter/coupler 330 may include one or any number of any suitable inputs and outputs and that the splitter/coupler 330 may comprise a greater number of inputs than outputs or a greater number of outputs than inputs.

Referring to FIG. 10, the optical splitter/coupler 330 comprises a cover frame 402, first entry segment 404, second entry segment 406, first exit segment 408, and second exit segment 410.

First entry segment 404 and first exit segment 408 comprise a first continuous optical fiber. Second entry segment 406 and second exit segment 410 comprise a second continuous optical fiber. Outside of the cover frame 402, segments 404, 406, 408, and 410 may comprise a jacket, a cladding, and a core fiber. Inside the cover frame 402, the jacket and cladding may be removed and the core fibers twisted, coupled, or fused together to allow the transfer of optical signals and/or energy of the signals between and among the first and second continuous optical fibers. In this way, the optical splitter/coupler 330 passively combines optical signals arriving from entry segments 404 and 406 and passively splits and forwards the signal via exit segments 408 and 410. A plurality of signals may be combined and the thereafter split or may be simultaneously combined and split the by transferring energy between fibers.

The optical splitter/coupler 330 provides flexible channel-spacing with no restrictions concerning channel-spacing in the main streamline. The splitter/coupler 330 may split the signal into two copies with substantially equal power. "Substantially equal" in this context means ±25%. In a particular embodiment, the coupler has a directivity of over −55 dB. Wavelength dependence on the insertion loss is less than about 0.5 dB. The insertion loss for a 50/50 coupler is less than about −3.5 dB.

Figure 11:
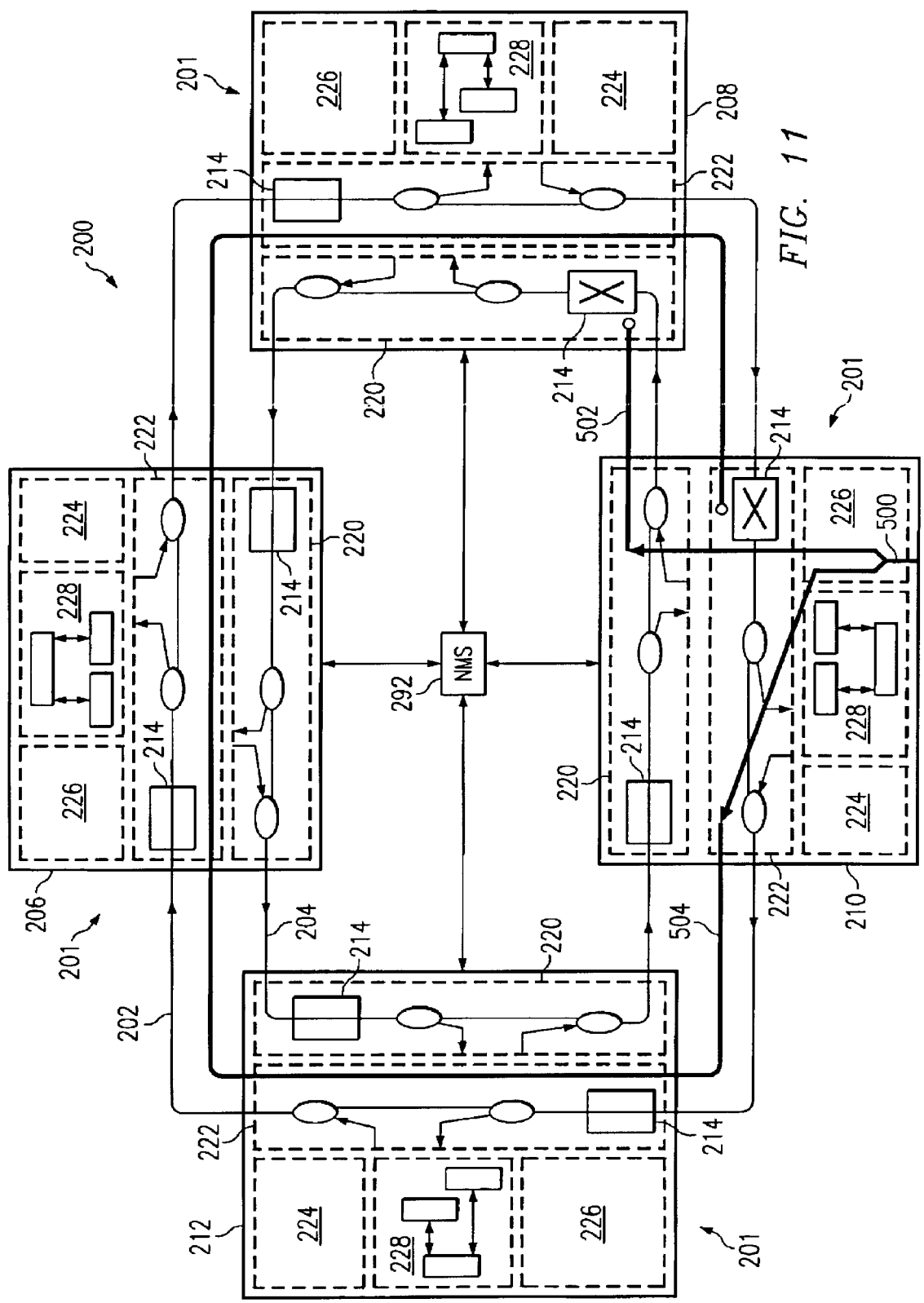
FIG. 11 is a block diagram illustrating the open ring configuration and light path flow of the optical network of FIG. 8 in accordance with one embodiment of the present invention.

FIG. 11 illustrates the optical network 200 with high level details of the nodes 206, 208, 210 and 212. As previously described, each node includes a counterclockwise transport element 220, a clockwise transport element 222, a distributing element 224, a combining element 226, and a managing element 228. The transport elements add and/or drop traffic to and from the rings 202 and 204. The combining element 226 combines ingress local traffic to generate an add signal that is provided to the transport elements 220 and 222 for transmission on the rings 202 and 204. The distributing element 224 receives a dropped signal and recovers local egress traffic for transmission to local clients. The managing element 228 monitors operation of the node 201 and/or network 200 and communicates with a NMS 292 for the network 200.

Referring to FIG. 11, each node 206, 208, 210 and 212 includes a ring switch 214 in each transport element 220 and 222 that is controllable to selectively open or close the connected ring 202 or 204 prior to the dropping or adding of traffic by the transport element 220 or 222 in the node. The ring switches 214 may be otherwise suitably positioned within one or more or each node 201 prior to the dropping and/or adding of traffic at an inside or outside edge of the node 201 or between the node and a neighboring node 201.

During normal operation, a single ring switch 214 is crossed or otherwise open in each ring 202 and 204 while the remaining ring switches 214 are closed. Thus, each ring 202 and 204 is continuous or otherwise closed except at the ring switch 214 that is open. The ring switches 214 that are open in the rings 202 and 204 together form a switch set that effectively opens the rings 202 and 204 of the network 200 in a same span and/or corresponding point of the network

200. A same span is opened in the network 200 in that, for example, the nodes 201 neighboring the span do not receive ingress traffic from the span. Such alignment of the open ring switches 214 in, along or at the periphery of a span allows each node 201 to communicate with each other node 201 in the network 200 while avoiding or minimizing interference from circulating traffic.

In the illustrated embodiment, ring switch 214 in the clockwise transport element 222 of node 210 is crossed, as is ring switch 214, in the counterclockwise transport element 220 of node 208. The remaining ring switches 214 are closed to a through position. A traffic channel 500 added at node 210 travels around the rings 202 and 204 in exemplary light paths 502 and 504. In particular, a counterclockwise light path 502 extends from the combining element 226 of node 210 to the counterclockwise transport element 220 where it is added to counterclockwise ring 204. On counterclockwise ring 204, light path 502 extends to node 208 where it is terminated by the crossed ring switch 214 of the counterclockwise transport element 220. Clockwise light path 504 extends from the combining element 226 of node 210 to the clockwise transport element 222 of node 210 where it is added to clockwise ring 202. On clockwise ring 202, light path 504 extends to ring 212, through the clockwise transport element 222 of ring 212, to ring 206, through the clockwise transport element 222 of ring 206, to node 208, through the clockwise transport element 222 of node 208, and back to node 210 where it is terminated by the crossed ring switch 214 on the ingress side of the clockwise transport element 222. Thus, each node 206, 208, 210 and 212 is reached by each other node from a single direction and traffic is prevented from circulating around either ring 202 and 204 or otherwise causing interference.

Figure 12:
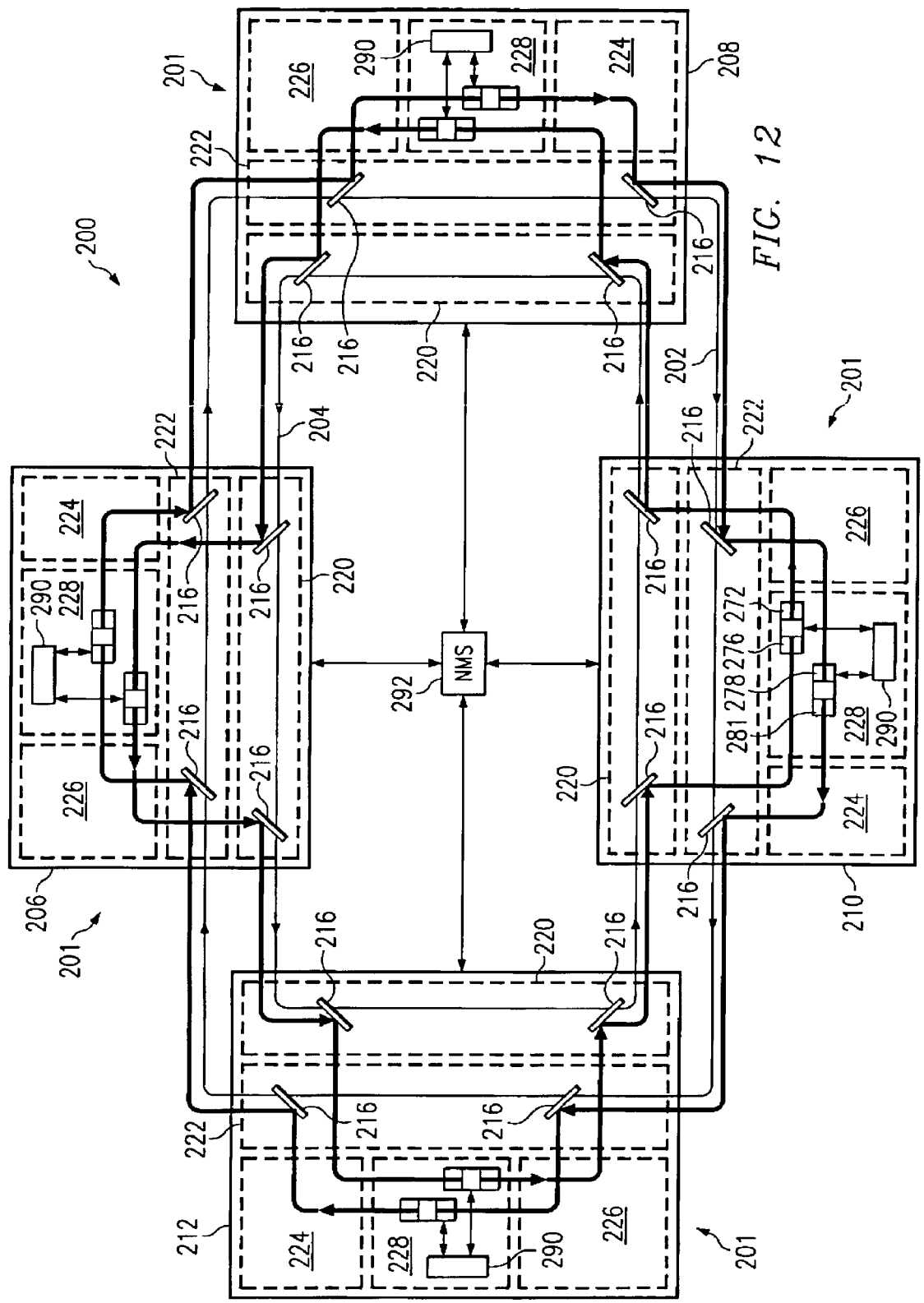
FIG. 12 is a block diagram illustrating the optical supervisory channel (OSC) flow in the optical network of FIG. 8 in accordance with one embodiment of the present invention.

FIG. 12 illustrates the optical network 200 with high level details of the nodes 206, 208, 210 and 212. The nodes each include the counterclockwise and clockwise transport elements 220 and 222 as well as the combining element 224, distributing element 226, and managing element 228. In addition to adding and dropping traffic channels to and from the rings 202 and 204, the transport elements 220 and 222 add and drop the OSC to and from the rings 202 and 204 for processing by managing element 228.

Referring to FIG. 12, as previously described, the transport elements 220 and 222 include an OSC filter 216 at an ingress point prior to the ring switches 214 to filter out and/or otherwise remove the OSC from the rings 202 and 204. In each node 201, the OSC signal from each ring 202 and 204 is passed to corresponding optical receiver 276 and 278 of the OSC unit for processing by EMS 290. In addition, the OSC signal generated by the EMS 290 for each ring 202 and 204 is transmitted by the optical sender 272 or 281 onto the corresponding ring 202 and 204 for transmission to the next node 201.

In normal operation, each node 201 receives an OSC signal from the neighboring nodes along the rings 202 and 204, processes the signal and passes the OSC signal on and/or adds its own OSC signal for transmission to the neighboring nodes.

Placement of the OSC filters 216 at the periphery of the transport elements 220 and 222 outside the ring switches 214 allows each node 201 to receive the OSC signal from its neighboring or adjacent nodes 201 regardless of the open/close status of its ring switches 214. If the OSC filters are inside the ring switches 214, for example in embodiments where the ring switches 214 are outside of the nodes 201, the OSC signals may be looped back between rings 202 and 204 at the edges of the open span. For example, for the illustrated embodiment, the EMS 290 of node 208 may pass received OSC information destined for node 210 from the clockwise OSC unit to the counterclockwise OSC unit for transmission to node 210 on the counterclockwise ring 204. Similarly, OSC information received at node 210 and destined for node 208 may be passed by the EMS 290 of node 210 from the counterclockwise OSC unit to the clockwise OSC unit for transmission to node 208 on the clockwise ring 202.

Figure 13:
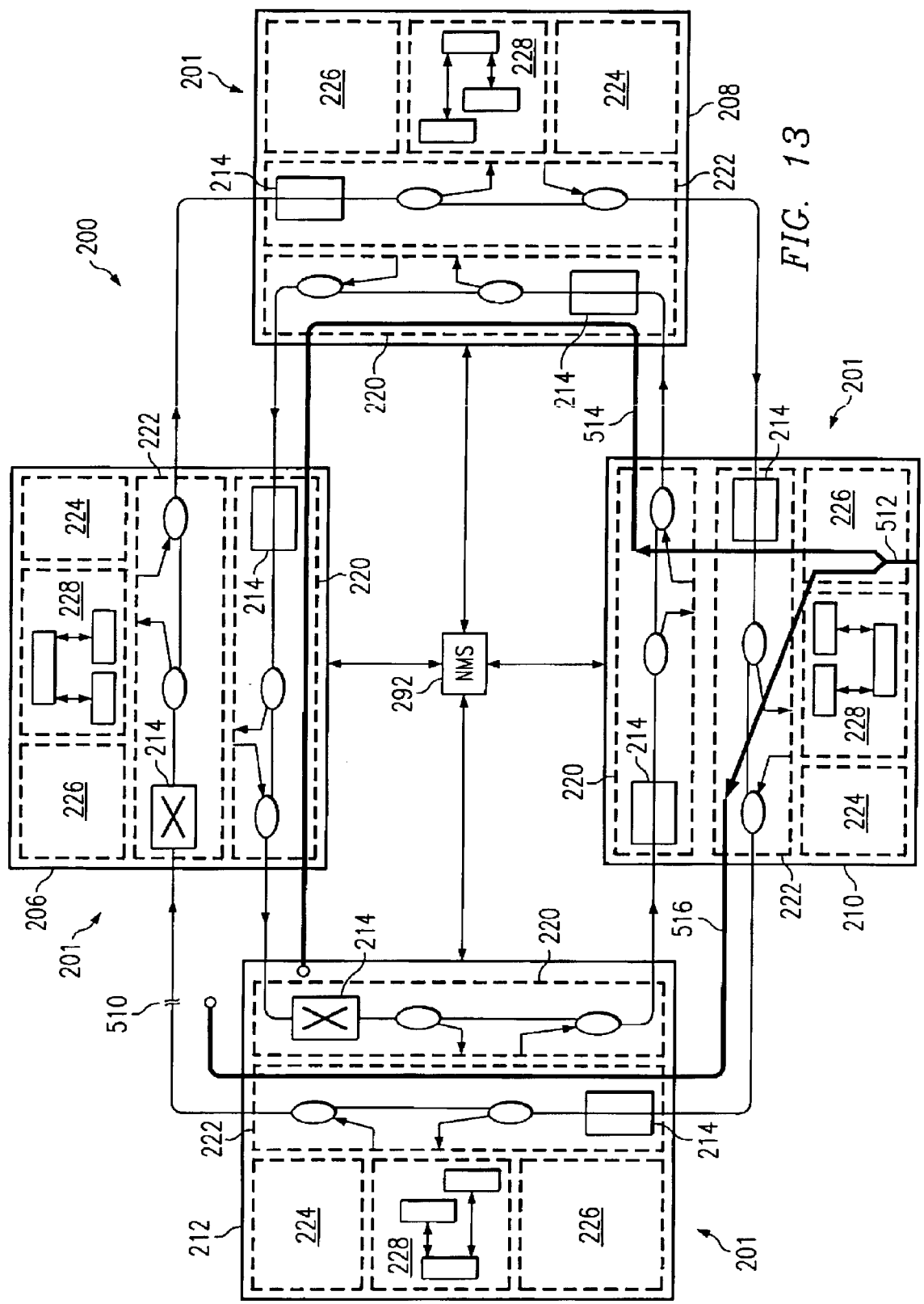
FIG. 13 is a block diagram illustrating protection switching and light path protection in the optical network of FIG. 8 in accordance with one embodiment of the present invention.

FIG. 13 illustrates protection switching and light path protection for network 200 in accordance with one embodiment of the present invention. As previously described, each node 206, 208, 210, and 212 includes clockwise and counterclockwise transport elements 220 and 222 as well as the combining, distributing and managing elements 224, 226, and 228. The managing elements each communicate with NMS 292.

Referring to FIG. 13, a fiber cut 510 is shown in ring 204 between nodes 206 and 212. In response, as described in more detail below, the NMS 292 opens the ring switch 214 in counterclockwise transport element 220 of node 212 and the ring switch 214 in clockwise transport element 222 of node 206, thus effectively opening the span between nodes 206 and 212. After opening the rings 202 and 204 on each side of the break, the NMS 292 closes any previously open ring switches 214 in the nodes 201.

After protection switching, each node 201 continues to receive traffic from each other node 201 in network 200 and an operable open ring configuration is maintained. For example, a signal 512 originated in node 210 is transmitted on counterclockwise light path 514 to nodes 208 and 206 and transmitted on clockwise light path 516 to node 212. In one embodiment, the NMS 292, EMS 290 and the 2×2 ring switches 214 may be configured for fast protection switching with a switching time of less than 10 milliseconds.

Figure 14:
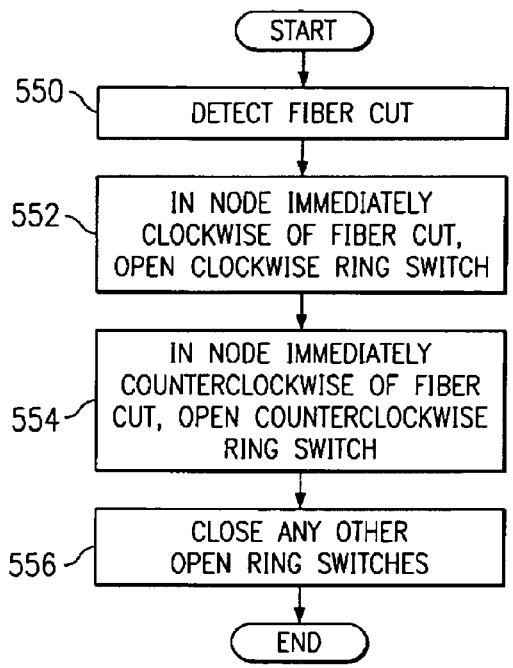
FIG. 14 is a flow diagram illustrating a method for protection switching for the optical network of FIG. 8 in accordance with one embodiment of the present invention.

FIG. 14 is a flow diagram illustrating a method for protection switching of an open ring optical network in accordance with one embodiment of the present invention. In this embodiment, the optical network may be network 200 including a plurality of nodes each having a ring switch at or proximate to an ingress point of each connected ring. The method may be used in connection with other suitable network and node configurations.

Referring to FIG. 14, the method begins at step 550 with the detection by the NMS 292 of a fiber cut of ring 202 or 204 of the network 200. The NMS 292 may detect and locate the fiber cut based on the OSC and/or other signals communicated by the node EMSs 290 to the NMS 292.

At step 552, the NMS 292 issues a command to the EMS 290 in the node 201 immediately clockwise of the cut to open the clockwise ring switch 246 in the clockwise transport element 222, thus opening the clockwise ring 202 at that node 201.

At step 554, the NMS 292 issues a command to the EMS 290 in the node 201 immediately counterclockwise of the cut to open the counterclockwise ring switch 244 in the counterclockwise transport element 220, thus opening the counterclockwise ring 204 at that node 201.

At step 556, any other ring switches 214 in the nodes 201 of the network 200 are closed. Thus, each ring 202 and 204 is essentially continuous with a single open point and/or segment. The open segment may be at a discrete switch and/or transmission element or may include part, all or even more than a span between nodes of the network 200. It will be understood that additional switches 214 in the rings 200 and/or 204 may remain open and transmission elements in the rings 202 and/or 204 may be turned off so long as, in one embodiment, each node 201 is able to communicate with each other node 201 through one of the rings 202 or 204.

An example of protection switching is illustrated by FIGS. 11 and 13. Referring back to FIG. 11, for example, the clockwise and counterclockwise rings 202 and 204 of network 200 are open in the transport elements 222 and 220 of nodes 210 and 208, respectively. In response to at least a ring cut 510 as illustrated by FIG. 13, protection switching crosses ring switch 214 and clockwise transport element 222 of node 206 and ring switch 214 of counterclockwise transport element 220 of node 212. Thus, in FIG. 13 the clockwise and counterclockwise rings 202 and 204 are opened at nodes 206 and 212, respectively. The previously crossed ring switches in nodes 208 and 210 are closed to a through position to allow each node 201 to continue to receive traffic from each other node 201 in the network 200. The fiber cut 510 may be repaired at a convenient time after protection switching is completed. Furthermore, it should be noted that, after repair of the fiber cut 510, there is no need to revert the switches 214 and nodes 201 to their pre-cut states. For example, the network initially configured as shown in FIG. 11 that is then configured as shown in FIG. 13 due to fiber cut 510, may remain configured as shown in FIG. 13 even after the cut 510 has been repaired. In this way, the steps shown in FIG. 14 may be repeated for any number of fiber cut events.

As previously described, the ring switches 214 and the nodes 201 may be reconfigured to provide protection switching in response to other types of network failures that would otherwise prevent one node 201 from communicating local and/or other traffic to a neighboring node 201. For example, in response to a failure of a unit within clockwise transport segment 222 of node 206, the failed unit may be turned off (if appropriate) and the adjacent ring switch 246 actuated from a closed, or through position to an open, or cross position. As previously described, a crossed ring switch 214 terminates traffic on the connected ring 202 or 204 but may pass the traffic to the OSAs for monitoring by the EMS 290 and/or for loop back and other types of testing. Next, the ring switch 214 of the counterclockwise transport element 220 in node 212 may also be repositioned to the crossed position.

After the ring switches are crossed, the previously crossed ring switches 214 are closed to a through position to allow each node 201 to fully communicate with each other node 201. During continued operation, the failed unit may be replaced and proper operation of the new unit confirmed with loopback and/or localized testing as described in more detail below. After the failed unit is replaced and proper operation is confirmed, the network 200 may be left in the current configuration, reverted to the previous configuration or configured to yet another configuration to support localized and/or loopback testing within the network 200.

A failure of an amplifier in the combining element 226 may be detected by an equipment alarm for a combining amplifier. For example, in response to an equipment alarm for a combining amplifier in the combining element 226 of the clockwise transport element 222 of node 210, the ring switch 246 of clockwise transport element 222 in node 212 may be crossed and the ring switch 244 in the counterclockwise transport element 220 of node 210 may also be crossed. Previously opened ring switches 214 are at the same time closed and the failed combining amplifier unit in node 210 replaced and tested to confirm proper operation.

In one embodiment, a test signal may be inserted into the network and transmitted on the clockwise and/or counterclockwise rings. The signal may be terminated at a crossed ring switch 214 and transmitted via port 248 or 252 of FIG. 9 to the OSA for analysis. By selectively closing the ring switches in the appropriate nodes, a selected light path may be tested with the OSA.

Likewise, in yet another embodiment, a localized area may be defined as necessary for light path or component testing, repair or replacement. To isolate the elements of the localized area from the rest of the in-service network, the clockwise ring switches 214 of a first node and the counterclockwise ring switch of a second node are opened. The localized area thus includes the opposite parts of two neighboring nodes such that, in one embodiment, a localized area may be defined covering any device of the node in the network. Thus, testing, replacement, and/or repair of components within the localized area may be conducted without interfering with the in-service network.

In certain circumstances, it may be desirable to test a light path originating from a combining element through the add coupler of a first node, transmitted around a ring through a plurality of nodes, and returning through the drop coupler of the first node to the distributing element of the first node. In this way, all the elements of each transport segments of a given ring direction of each node may be tested. Such a light path may be created by physically separating the optical fiber at a point between the add coupler and the drop coupler of a transport segment of the first node.

Figure 15:
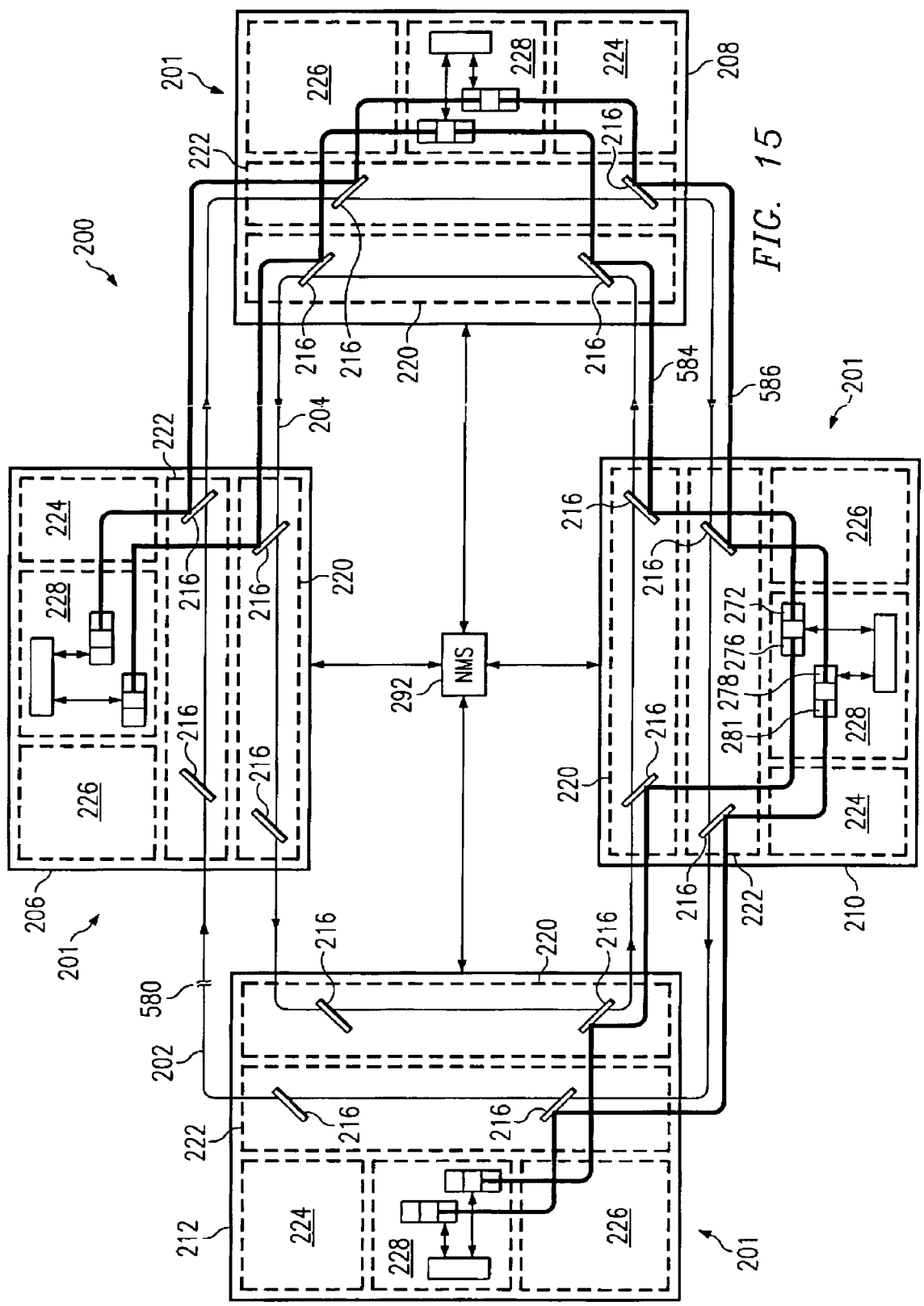
FIG. 15 is a block diagram illustrating OSC protection in the optical network of FIG. 8 in response to a line cut in accordance with one embodiment of the present invention.

FIG. 15 illustrates OSC protection for network 200 in response to a line cut in accordance with one embodiment of the present invention. In this embodiment, optical-electrical loopback in the managing elements 228 of the nodes 201 is used for protection of OSC.

Referring to FIG. 15, a fiber cut or other line break 580 is shown in clockwise ring 202 between nodes 206 and 212. In response to the fiber cut 580, an optical electrical loopback 582 is established from the counterclockwise OSC system to the clockwise OSC system through EMS 290 in node 206 and from the clockwise OSC system to the counterclockwise OSC system through EMS 290 in node 212.

In a specific embodiment, the optical-electrical loopback in node 206 comprises receiving at the counterclockwise OSC unit of the managing element 228 of node 206 the OSC 584 from the counterclockwise ring 204 and processing the OSC at the EMS 290 as described above However, instead of transmitting the processed OSC as an egress signal on the counterclockwise ring 204 from node 206, the processed OSC is transmitted from the EMS 290 to the clockwise OSC unit and then onto clockwise ring 202, therefore looping the OSC back to node 206 from a counterclockwise to a clockwise signal.

Similarly, the optical-electrical loopback in node 212 comprises receiving at the clockwise OSC unit of the management element 228 of node 212 the OSC 586 from the clockwise ring 202 and processing the OSC at the EMS 290 as described above. However, instead of transmitting the processed OSC as an egress signal on the clockwise ring 202 from node 212, the processed OSC is transmitted from the EMS 290 to the counterclockwise OSC unit and then to counterclockwise ring 204, therefore looping the OSC back to node 212 from a clockwise to a counterclockwise signal. In this way, each node 201 in the network 200 continues to receive the OSC from each other node 201 in the network 200. The optical-electrical loopback 582 may be used during normal or protection-switched operations and may be used when the OSC signal is transmitted in-band or in another embodiment which the OSC signal passes through the ring switches 214.

The OSC flow procedure is the same for both the normal and the protection-switching scenarios. For example, in FIG. 12, if a ring switch 214 in the counterclockwise transport element 220 of the node 208 and a ring switch 214 in the clockwise element 222 have the cross positions shown in FIG. 11, it may be wise to deploy the optical-electrical loopbacks from clockwise to counterclockwise in the node 208 and from counterclockwise to clockwise in node 220.

Figure 16:
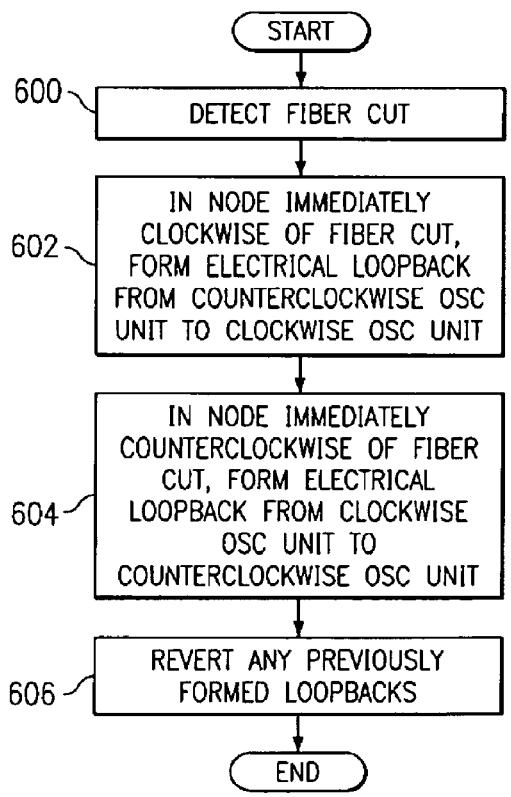
FIG. 16 is a flow diagram illustrating a method for OSC protection switching in the optical network of FIG. 8 in accordance with one embodiment of the present invention.

FIG. 16 illustrates a method for OSC protection switching in an optical network in accordance with one embodiment of the present invention. In this embodiment, protection switching is implemented in response to a fiber cut. However, it will be understood that OSC protection switching may be implemented in response to other types of failures and may be implemented in conjunction with light path protection switching.

Referring to FIG. 16, the method begins at step 600 with the detection by the NMS 292 of a fiber cut 580 in a span of a ring 202 or 204 of the optical network 200. The NMS 292 may detect the failure based on OSC and/or other signals from EMS 290 of the nodes 201.

At step 602, the NMS 292 issues a command to the EMS 290 in the node 201 immediately clockwise of the cut 580 to form an electrical loopback from the counterclockwise OSC unit to the clockwise OSC unit, thus creating, as described above, an optical-electrical loopback of the OSC from the counterclockwise ring 204 to the clockwise ring 202. Of course, the EMS 290 in the node 206 may detect the fiber cut 580 and execute this electrical loopback without the command from NMS 292.

At step 604, the NMS 292 issues a command to the EMS 290 in the node 201 immediately counterclockwise of the cut to form an electrical loopback from the clockwise OSC unit to the counterclockwise OSC unit, thus creating, as described above, an optical-electrical loopback of the OSC from the clockwise ring 202 to the counterclockwise ring 204. It will be understood that in this and other forms of protection switching, the NMS 292 may itself directly control devices in the nodes 201, may otherwise communicate with the devices to provide protection switching and/or the managing elements 228 of the nodes 201 may communicate among themselves to provide the functionality of the NMS 292.

At step 606, any other nodes 201 containing loopbacks that may have been previously formed are reverted to a non-loopbacked state. Or, if the OSC optical-electrical loopback procedure is deployed in nodes which have the ring switch in the cross-position, the reverting is not required. In this way, OSC data may continue to be transmitted by and received and processed at each node 201 in the network 200. After completion of the method, the fiber cut 580 may be repaired and tested. Also as above, after repair of the fiber cut 580, there is no need to revert the network 200 to its pre-switch state.

Figure 17:
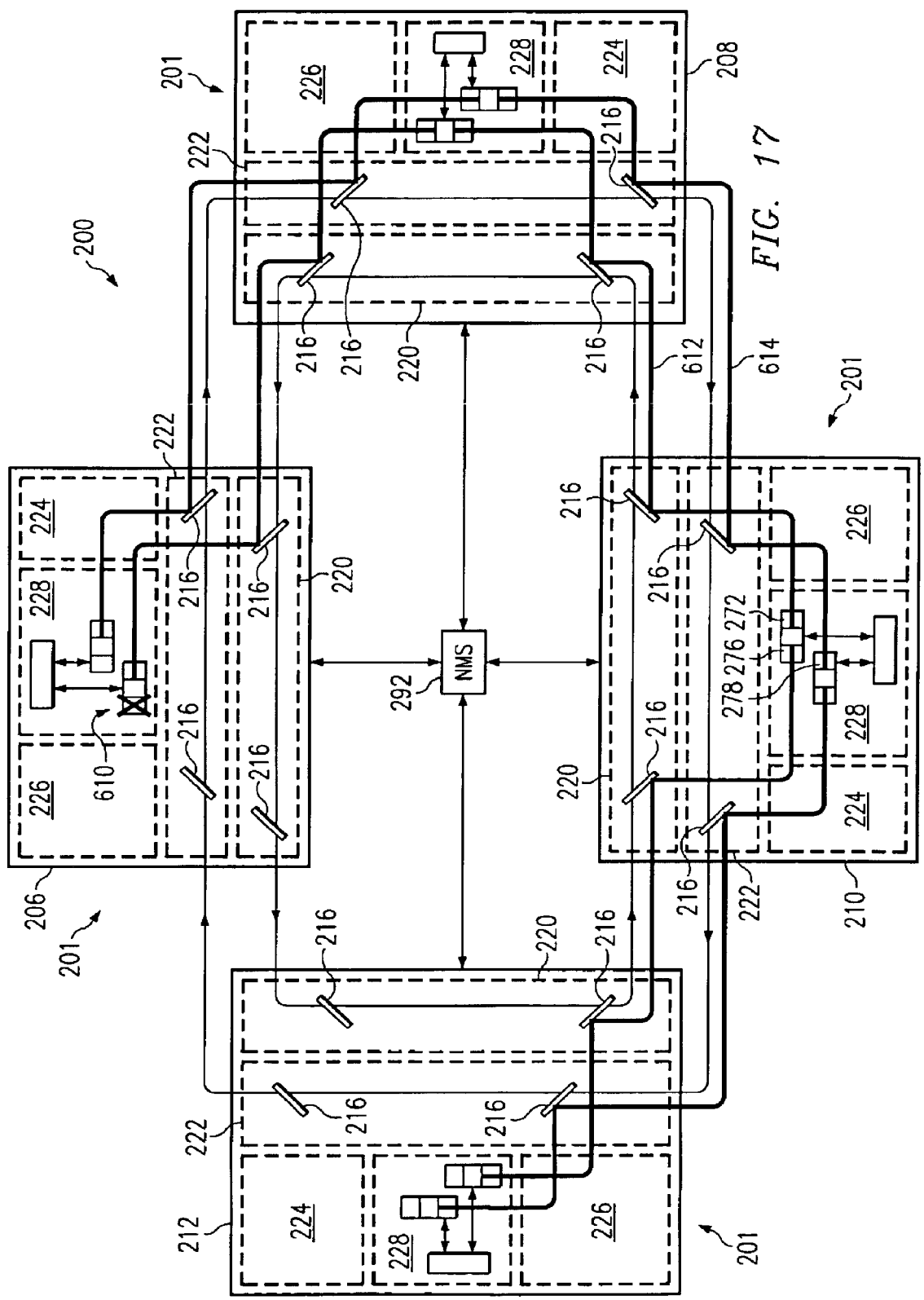
FIG. 17 is a block diagram illustrating OSC protection in the optical network of FIG. 8 in response to an OSC equipment failure in accordance with one embodiment of the present invention.

FIG. 17 illustrates OSC protection switching in the network 200 in response to an OSC equipment failure in accordance with one embodiment of the present invention. In this embodiment, protection switching is implemented for failure of an OSC sender. Failure of an OSC filter 216 or an OSC receiver 276 or 278 may necessitate similar protection switching so that each node 201 may continue to be serviced by OSC data even in the event of an equipment failure.

Referring to FIG. 17, counterclockwise OSC sender 281 of node 206 is detected as having failed. In a particular exemplary embodiment, a failure of an OSC optical sender 272 or 281 or an OSC optical receiver 276 or 278 may be detected by the NMS 292 or EMS 290 in the node 206 based on an LOL alarm for the optical receiver or a downstream optical receiver with or without another failure alarm. For example, an equipment alarm for the optical sender 281 in the counterclockwise OSC unit of the managing element 282 of node 206 would indicate a failure 610 of that optical sender. In response, the NMS 292 or EMS 290 in the node 206 may loopback counterclockwise OSC 612 to clockwise OSC at node 206. At node 212, the NMS 292 loopbacks the clockwise OSC 614 to the counterclockwise OSC. Any previous loopbacks in nodes 208 and/or 210 are broken and the information sent through the nodes.

After protection switching, the failed optical sender 281 may be replaced and thereafter tested using clockwise OSC. After confirming operation of the replaced optical sender 281, the network 200 may continue to operate in its present state or may revert to the initial OSC state. As previously discussed, for a fiber cut between nodes 206 and 210 the same procedure may be followed with the fiber cut repaired and tested.

Figure 18:
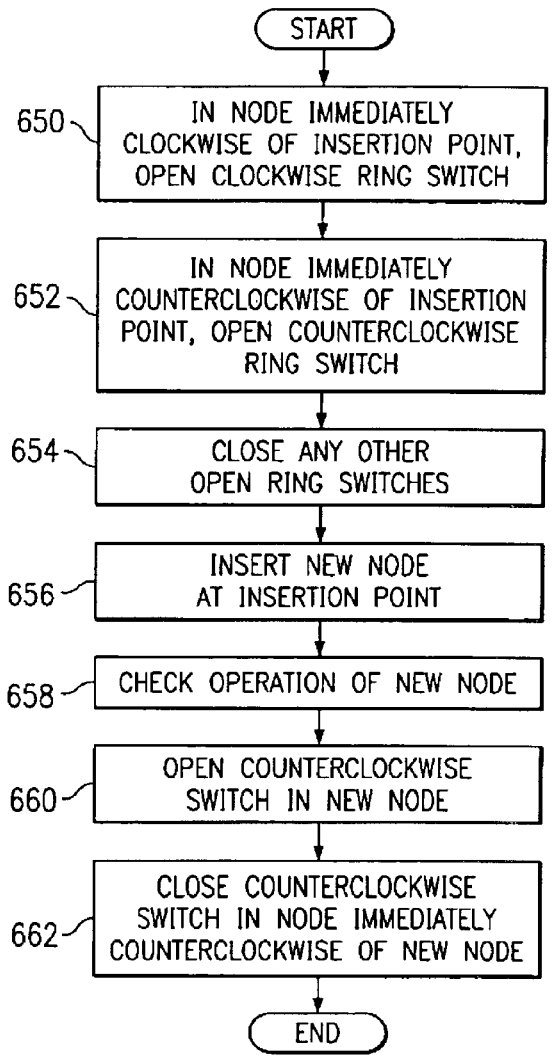
FIG. 18 is a flow diagram illustrating a method for inserting a node into the optical network of FIG. 8 in accordance with one embodiment of the present invention.

FIG. 18 illustrates a method for inserting a node 201 into the optical network 200 in accordance with one embodiment of the present invention. Node insertion may take full advantage of the scalability in the design of network 200. Other suitable elements may be similarly inserted between the existing nodes 201 of the optical network 200.

Referring to FIG. 18, the method begins with step 650 wherein the clockwise ring switch 214 is opened in the node 201 immediately clockwise of the insertion point for the new node. Proceeding to step 652, the counterclockwise ring switch 214 is opened in the node 201 immediately counterclockwise of the insertion point. At step 654, any other open ring switches 214 are closed. Thus, the nodes 201 of the network 200 may each communicate with each other without communicating across a span in which the new node is to be added.

Proceeding to step 656, the new node is inserted at the insertion point. Such insertion may require the physical separation of the clockwise and counterclockwise optical ring fibers. At step 658, the operation of amplifiers, switches, and other elements of the new node may be checked and tested.

Proceeding to step 660, the counterclockwise switch 214 in the new node is opened. At step 662, the counterclockwise switch 214 is closed in the node 201 immediately counterclockwise of the new node. In this way, the counterclockwise ring 204 is open at the new node and the clockwise ring 202 is open at the node 201 immediately clockwise of the new node. In another embodiment, the clockwise switch 214 in the new node may be opened and the clockwise switch 214 in the node immediately clockwise of the new node may be closed.

FIGS. 19A–19E are block diagrams illustrating optical networks in accordance with various alternative embodiments of the present invention. As is made clear by FIGS. 19A–19E, the present invention is not limited to ring networks but may be employed in a variety of optical networks. In accordance with the following embodiments, each of the network nodes comprise a combiner 44 and/or a distributor 46 as described in reference to FIG. 2. It will be understood that other suitable combiners and distributors may be substituted for combiner 44 and 46. For example, the alternative transmitter and receiver arrangements of FIGS. 5 and 6 may be utilized. In addition or in the alternative, combiner 125 of FIG. 4A may be substituted for combiner 44 and receiver 135 of FIG. 4B may be substituted for distributor 46.

The networks of FIGS. 19A–19E may comprise wavelength division multiplexing (WDM), dense wavelength division multiplexing (DWDM), or other suitable multi-channel network. The network A may be used in a short haul metropolitan network, a long haul inner city network, or any other suitable network or combination of networks. Optical information signals are transmitted in the networks of FIGS. 19A–19E have at least one characteristic modulated to encode audio, video, textual, real-time, non-real-time, and/or other suitable data. Modulation may be based on phase shift keying (PSK), intensity modulation (IM), Return to Zero (RZ), Non Return to Zero (NRZ) and other suitable methodologies.

Figure 19A:
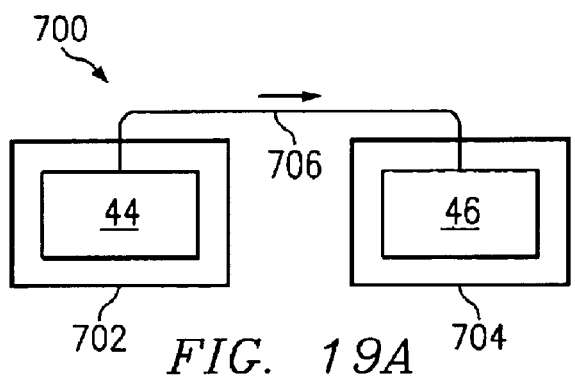
FIGS. 19A–19E are block diagrams illustrating optical networks in accordance with various alternative embodiments of the present invention.

Referring to FIG. 19A, network 700 is a unidirectional network that includes add node 702, drop node 704, and fiber optical line 706. At add node 702, traffic from local clients is added to the line 706 via combiner 44. Drop node 706 is operable to passively drop signals from the line 706 and to receive and terminate all channels via distributor 46.

Figure 19B:
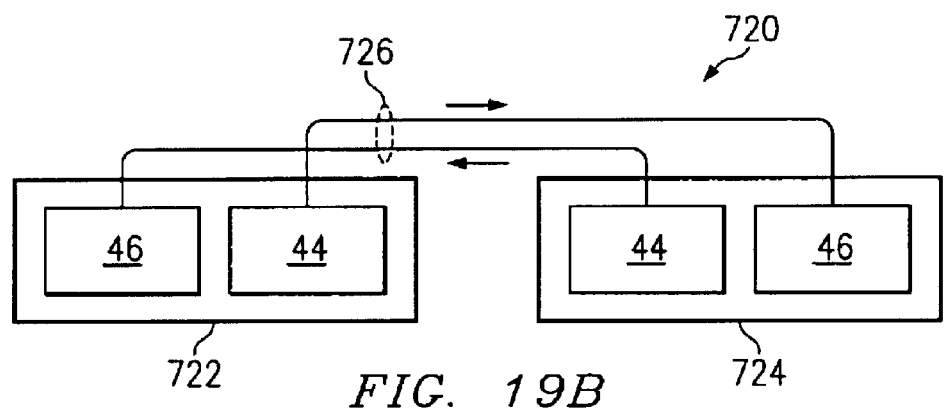

Referring to FIG. 19B, network 720 is an optical network in which a number of optical channels are carried over a bi-directional path at disparate wavelengths. Network 720 includes a fiber optical line 726 and optical add/drop nodes 722 and 724. Add/drop nodes 722 and 724 each comprise a combiner 44 and a distributor 46. Line 726 may comprise a single, bi-directional fiber or two unidirectional fibers.

Optical information signals are transmitted on the line 726 in both directions. Add/drop nodes 722 and 724 are operable to passively drop signals from the line 726 to local clients, to terminate selected channels, and to passively add traffic from local clients to line 726.

Figure 19C:
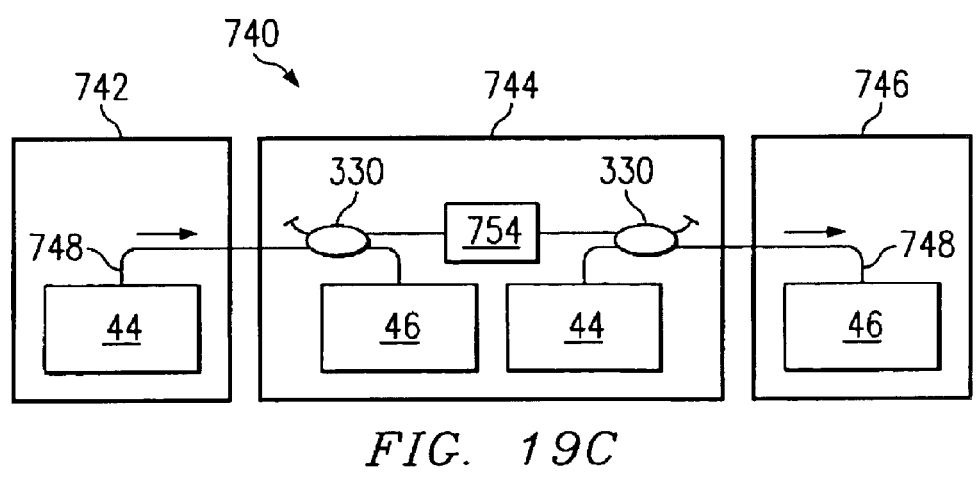

Referring to FIG. 19C, network 740 includes fiber optical line 748, add node 742, add/drop node 744, and drop node 746. Add node 742 comprises combiner 44, and drop node 746 comprises distributor 46. Add/drop node 744 comprises combiner 44, distributor 46, drop coupler 750, add coupler 752, and channel reuse module 744. Optical information signals may be transmitted on the line 748 from add node 742 to add/drop node 744 from add/drop node 744 to drop node 746. Drop node 746 is operable to passively drop signals from the line 748 and to terminate all channels. At add/drop node 744, traffic from local clients is added to the line 748 via coupler 330 while traffic destined for local traffic is dropped via a second coupler 330. Channel reuse module 754 may comprise channel reuse module 42 as described above in reference to FIG. 2 or another suitable channel reuse module. In a particular embodiment, reuse module 754 may be omitted if, for example, channel reuse is not necessary or desirable.

Figure 19D:
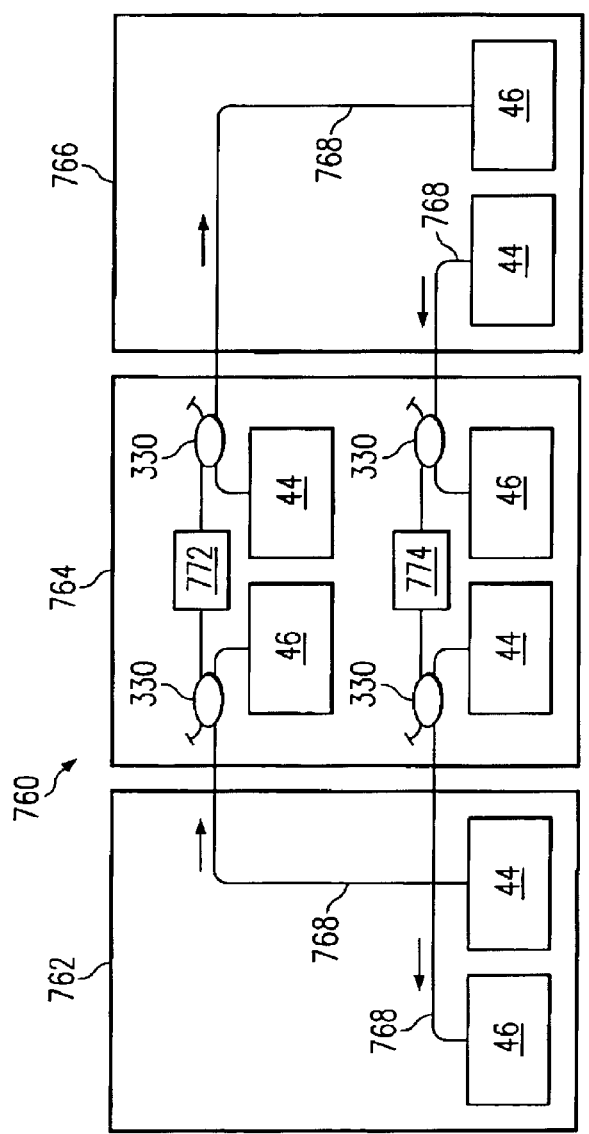

Referring to FIG. 19D, network 760 is a bi-directional network. Fiber line 768 may comprise two unidirectional fibers or a single, bi-directional fiber. Add/drop nodes 762 and 766 are operable to passively add and drop traffic from local clients to and from line 768. In a particular embodiment, add/drop node 764 also passively adds and drops traffic via couplers 330 as illustrated. Channel reuse module 772 may comprise channel reuse module 42 as described above in reference to FIG. 2 or another suitable channel reuse module. In a particular embodiment, reuse module 772 may be omitted if, for example, channel reuse is not necessary or desirable.

Figure 19E:
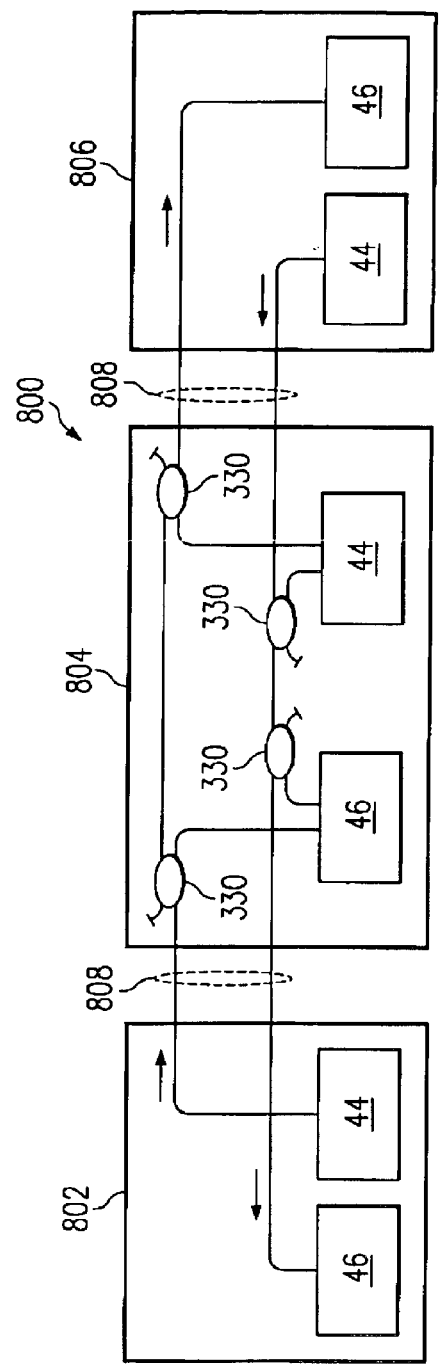

Referring to FIG. 19E, network 800 is a bi-directional network. Fiber line 808 may comprise two unidirectional fibers or a single, bi-directional fiber. Add/drop nodes 802 and 806 are operable to passively add and drop traffic from local clients to and from line 808. In a particular embodiment, add/drop node 804 also passively adds and drops traffic via couplers 330 as illustrated. In a particular embodiment, a channel reuse module may be utilized as in FIG. 19D if channel reuse is necessary or desirable.

Although the present invention has been described with several embodiments, various changes and modifications may be suggested to one skilled in the art. It is intended that the present invention encompass such changes and modifications as fall within the scope of the appended claims.

What is claimed is:

1. An add/drop node for an optical network, comprising:
   a network drop splitter operable to be coupled to a network optical fiber and to stages of drop splitters, the network drop splitter operable to passively split an optical signal received from the network optical fiber into multiple copies of the signal, the stages of drop splitters operable to passively split at least one of the copies of the optical signal from the network drop splitter into additional copies of the signal;
   a plurality of filters, each of the filters operable to filter at least one copy of the signal from at least one drop splitter of the stages of drop splitters so as to pass a specific traffic channel to a coupled receiver; and
   a channel reuse module operable to be coupled to the network optical fiber and further operable to selectively terminate portions of the signal on the network optical fiber, wherein the channel reuse module comprises a demultiplexer, a multiplexer, and a plurality of optical switches operable to terminate selected wavelengths from the signal, the optical switches coupled between the demultiplexer and the multiplexer and operable to forward non-terminated channels to the multiplexer.

2. The add/drop node of claim 1, wherein the filter comprises a tunable filter.

3. The add/drop node of claim 1, wherein the receiver comprises a broadband receiver.

4. The add/drop node of claim 1, further comprising a network add splitter coupled to the network optical fiber and to stages of add splitters, the stages of add splitters operable to passively combine optical signals from a plurality of transmitters onto the network optical fiber via the network add splitter.

5. The add/drop node of claim 4, further comprising a plurality of amplifiers operable to amplify the signal from the transmitters.

6. The add/drop node of claim 5, further comprising at least one filter operable to reduce the noise of the amplifier.

7. The add/drop node of claim 1, further comprising a redundant tunable filter operable to pass a specific traffic channel to a broadband receiver in the event of a failure of the specific traffic channel to pass to its normally intended receiver.

8. An optical network, comprising:
   a network optical fiber carrying a signal on the optical network; and
   at least one add/drop node, the add/drop node comprising:
     a network drop splitter operable to be coupled to the network optical fiber and to stages of drop splitters and operable to passively split the signal received from the network optical fiber into multiple copies of the signal, the stages of drop splitters operable to passively split at least one of the copies of the optical signal from the network drop splitter into additional copies of the signal;
     a plurality of filters, each of the filters operable to receive at least one copy of the signal from at least one drop splitter of the stages of drop splitters and to filter the copy to pass a specific traffic channel to a coupled broadband receiver; and a channel reuse module operable to be coupled to the network optical fiber and further operable to selectively terminate portions of the signal on the network optical fiber, wherein the channel reuse module comprises a demultiplexer, a multiplexer, and a plurality of optical switches operable to terminate selected wavelengths from the signal, the optical switches coupled between the demultiplexer and the multiplexer and operable to forward non-terminated channels to the multiplexer.

9. The optical network of claim 8, wherein the add/drop node further comprises a network add splitter coupled to the network optical fiber and to stages of add splitters, the stages of add splitters operable to passively combine optical signals from a plurality of transmitters onto the network optical fiber via the network add splitter.

10. A method of managing signals on an optical network, comprising:

transmitting a plurality of optical signals from a plurality of transmitters;

passively combining the plurality of optical signals into an add signal;

passively combining the add signal to a passthrough signal to generate an egress signal for transport on an optical network;

passively splitting an ingress optical signal from the network into a transport signal and a drop signal;

passively splitting the drop signal into multiple copies of the drop signal; filtering each of the multiple drop signals to pass from each of the multiple drop signals a selected drop channel;

receiving the selected drop channels at receivers; and selectively passing by a channel reuse module at least selected channels of the transport signal as the passthrough signal, wherein the channel reuse module comprises a demultiplexer, a multiplexer, and a plurality of optical switches operable to terminate selected wavelengths from the signal, the optical switches coupled between the demultiplexer and the multiplexer and operable to forward non-terminated channels to the multiplexer.

11. The method of claim 10, further comprising amplifying at least one of the optical signals transmitted from the plurality of transmitters.

12. The method of claim 10, wherein the passing of at least selected channels of the transport signal comprises filtering the signal.

13. The method of claim 10, wherein the passing of at least selected channels of the transport signal comprises terminating the signal with an optical switch.

14. The method of claim 10, wherein the passing of at least a selected channels of the transport signal comprises terminating selected grouping paths.

15. An add/drop node for an optical network, comprising:

a transport element operable to passively drop local drop traffic from an ingress signal to a distributor and to passively add local add traffic from a combiner to a passthrough signal to generate an egress signal; and a channel reuse module operable to selectively terminate one or more channels of the ingress signal to generate the passthrough signal, wherein the channel reuse module comprises a demultiplexer, a multiplexer, and a plurality of optical switches operable to terminate selected wavelengths from the signal, the optical switches coupled between the demultiplexer and the multiplexer and operable to forward non-terminated channels to the multiplexer.

16. An add/drop node for an optical network, comprising:

means for transmitting a plurality of optical signals;

means for passively combining the plurality of optical signals into an add signal;

means for passively combining the add signal to a passthrough signal to generate an egress signal for transport on an optical network;

means for passively splitting an ingress optical signal from the network into a transport signal and a drop signal;

means for passively splitting the drop signal into multiple copies of the drop signal;

means for filtering each of the multiple drop signals to pass from each of the multiple drop signals a selected drop channel;

means for receiving the selected drop channels; and means for selectively passing by a channel reuse module at least selected channels of the transport signal as the passthrough signal, wherein the channel reuse module comprises a demultiplexer, a multiplexer, and a plurality of optical switches operable to terminate selected wavelengths from the signal, the optical switches coupled between the demultiplexer and the multiplexer and operable to forward non-terminated channels to the multiplexer.

17. The add/drop node of claim 16, further comprising means for amplifying at least one of the optical signal transmitted from the means for transmitting.

18. The method of claim 16, wherein the means for passing the at least selected channels of the transport signal comprises a filter.

19. The method of claim 16, wherein the means for passing the at least selected channels of the transport signal comprises an optical switch.

20. An add/drop node for an optical network, comprising:

a network drop splitter operable to passively drop from the optical network a combined signal, the combined signal comprising a plurality of traffic channels;

a passive distributor coupled to the network drop splitter, the passive distributor comprising a plurality of stages of drop splitters, each of the stages operable to passively split each of one or more copies of the combined signal provided to the stage into a plurality of copies of the combined optical signal;

the passive distributor further comprising a plurality of filters coupled to the stages of drop splitters, each filter operable to filter a copy of the combined signal so as to pass a specific traffic channel to a coupled receiver; and a channel reuse module operable to be coupled to the network optical fiber and further operable to selectively terminate portions of the signal on the network optical fiber, wherein the channel reuse module comprises a demultiplexer, a multiplexer, and a plurality of optical switches operable to terminate selected wavelengths from the signal, the optical switches coupled between the demultiplexer and the multiplexer and operable to forward non-terminated channels to the multiplexer.

21. The add/drop node of claim 1, wherein the network drop splitter is operable to passively split the optical signal into a first copy of the optical signal communicated to the stages of drop splitters and a second copy that is continued along the optical fiber.

22. The optical network of claim 8, wherein the network drop splitter is operable to passively split the optical signal into a first copy of the optical signal communicated to the stages of drop splitters and a second copy that is continued along the optical fiber.

23. An add/drop node for an optical network, comprising:
a network drop splitter operable to be coupled to a network optical fiber and to stages of drop splitters, the network drop splitter operable to passively split an optical signal received from the network optical fiber into multiple copies of the signal, the stages of drop splitters operable to passively split at least one of the copies of the optical signal from the network drop splitter into additional copies of the signal;
a plurality of filters, each of the filters operable to filter at least one copy of the signal from at least one drop splitter of the stages of drop splitters so as to pass a specific traffic channel to a coupled receiver; and
a channel reuse module operable to be coupled to the network optical fiber and further operable to selectively terminate portions of the signal on the network optical fiber, wherein the channel reuse module comprises:
a circulator;
a demultiplexer coupled to the circulator;
a plurality of tunable filters coupled to the demultiplexer, at least one tunable filter being operable to attenuate a demultiplexed signal; and
a plurality of mirrors coupled to the plurality of tunable filters and operable to reflect the attenuated signals in order to terminate selected wavelengths from the signal on the network optical fiber.

24. An add/drop node for an optical network, comprising:
a transport element operable to passively drop local drop traffic from an ingress signal to a distributor and to passively add local add traffic from a combiner to a passthrough signal to generate an egress signal; and
a channel reuse module operable to selectively terminate one or more channels of the ingress signal to generate the passthrough signal, wherein the channel reuse module comprises:
a circulator;
a demultiplexer coupled to the circulator;
a plurality of tunable filters coupled to the demultiplexer, at least one tunable filter being operable to attenuate a demultiplexed signal; and
a plurality of mirrors coupled to the plurality of tunable filters and operable to reflect the attenuated signals in order to terminate selected wavelengths from the signal on the network optical fiber.

25. An add/drop node for an optical network, comprising:
a network drop splitter operable to passively drop from the optical network a combined signal, the combined signal comprising a plurality of traffic channels;
a passive distributor coupled to the network drop splitter, the passive distributor comprising a plurality of stages of drop splitters, each of the stages operable to passively split each of one or more copies of the combined signal provided to the stage into a plurality of copies of the combined optical signal;
the passive distributor further comprising a plurality of filters coupled to the stages of drop splitters, each filter operable to filter a copy of the combined signal so as to pass a specific traffic channel to a coupled receiver; and
a channel reuse module operable to be coupled to the network optical fiber and further operable to selectively terminate portions of the signal on the network optical fiber, wherein the channel reuse module comprises:
a circulator;
a demultiplexer coupled to the circulator;
a plurality of tunable filters coupled to the demultiplexer, at least one tunable filter being operable to attenuate a demultiplexed signal; and
a plurality of mirrors coupled to the plurality of tunable filters and operable to reflect the attenuated signals in order to terminate selected wavelengths from the signal on the network optical fiber.

* * * * *

UNITED STATES PATENT AND TRADEMARK OFFICE
CERTIFICATE OF CORRECTION

PATENT NO. : 6,842,562 B2
DATED : January 11, 2005
INVENTOR(S) : Kinoshita et al.

It is certified that error appears in the above-identified patent and that said Letters Patent is hereby corrected as shown below:

Column 3,
Line 66, before "34" delete "slitters" and insert -- splitters --.

Column 8,
Line 5, after "each" delete "trop" and insert -- drop --.

Column 14,
Line 24, after "and" delete "the".
Line 25, after "split" delete "the".
Line 49, after "with" delete "a" and insert -- an --.

Column 18,
Line 44, after "above" insert -- . --.

Column 23,
Line 56, after "least" delete "a".

Column 24,
Line 31, after "optical" delete "signal" and insert -- signals --.

Signed and Sealed this

Twenty-first Day of March, 2006

JON W. DUDAS
*Director of the United States Patent and Trademark Office*